United States Patent
Greslehner-Nimmervoll et al.

(10) Patent No.: US 12,468,813 B2
(45) Date of Patent: Nov. 11, 2025

(54) SEQUENCER FIRMWARE CALLS DURING RADAR RAMP SCENARIO

(71) Applicant: Infineon Technologies AG, Neubiberg (DE)

(72) Inventors: Bernhard Greslehner-Nimmervoll, Hagenberg (AT); Rainer Findenig, Linz (AT)

(73) Assignee: Infineon Technologies AG, Neubiberg (DE)

( * ) Notice: Subject to any disclaimer, the term of this patent is extended or adjusted under 35 U.S.C. 154(b) by 202 days.

(21) Appl. No.: 18/360,903

(22) Filed: Jul. 28, 2023

(65) Prior Publication Data
US 2025/0036768 A1    Jan. 30, 2025

(51) Int. Cl.
*G06F 21/57* (2013.01)
*G06F 21/52* (2013.01)

(52) U.S. Cl.
CPC ............ *G06F 21/572* (2013.01); *G06F 21/52* (2013.01)

(58) Field of Classification Search
CPC ........ G06F 21/572; G06F 21/52; G01S 7/282; G01S 7/285; G01S 13/10
See application file for complete search history.

(56) References Cited

U.S. PATENT DOCUMENTS

| | | | | |
|---|---|---|---|---|
| 8,606,204 | B2* | 12/2013 | McCorkle | H04B 1/408 |
| | | | | 455/73 |
| 11,914,022 | B2* | 2/2024 | Heller | G01S 13/534 |
| 2008/0284651 | A1* | 11/2008 | Pearson | G01S 7/4008 |
| | | | | 342/372 |
| 2016/0277546 | A1* | 9/2016 | Unhold | H03L 7/1976 |
| 2019/0250247 | A1 | 8/2019 | Schmid et al. | |
| 2019/0383929 | A1* | 12/2019 | Melzer | H03L 7/0991 |

* cited by examiner

*Primary Examiner* — Hyun Soo Kim
(74) *Attorney, Agent, or Firm* — Harrity & Harrity, LLP

(57) ABSTRACT

A radar semiconductor chip includes a ramp signal generator configured to generate a frequency-modulated ramp signal comprising a plurality of frequency ramps of a ramp scenario; a first memory configured to store a sequencing program associated with generating the frequency-modulated ramp signal; a second memory configured to store a firmware program corresponding to a firmware opcode of the sequencing program; a sequencer configured to derive control values for a plurality of ramp parameters based on a plurality of ramp opcodes of the sequencing program, provide the control values to the ramp signal generator, and provide a start signal to start an execution of a firmware call in response to reading the firmware opcode; and a central processing unit configured to receive the start signal from the sequencer and, in response to the start signal, execute the firmware program from the second memory in parallel to the ramp scenario.

20 Claims, 9 Drawing Sheets

500

SEQUENCER FIRMWARE CALLS DURING RADAR RAMP SCENARIO

BACKGROUND

Radar sensors are used in a number of applications to detect objects, where the detection typically comprises measuring distances, velocities, or angles of arrival associated with detected targets. In particular, in the automotive sector, there is an increasing need for radar sensors that are able to be used in, for example, driving assistance systems (e.g., advanced driver assistance systems (ADAS)), such as, for example, in adaptive cruise control (ACC) or radar cruise control systems. Such systems are able to automatically adjust a speed of a motor vehicle in order to maintain a safe distance from other motor vehicles traveling in front of the motor vehicle (and from other objects and pedestrians). Other example applications of a radar sensor in the automotive sector include blind spot detection, lane change assist, and the like.

SUMMARY

In some implementations, a radar semiconductor chip includes a ramp signal generator configured to generate a frequency-modulated ramp signal comprising a plurality of frequency ramps of a ramp scenario, wherein the ramp signal generator is configured to generate the plurality of frequency ramps according to a plurality of ramp parameters, and wherein the ramp signal generator is configured to generate each frequency ramp with a predetermined time dependency relative to each other frequency ramp of the plurality of frequency ramps; a first memory configured to store a sequencing program associated with generating the frequency-modulated ramp signal, wherein the sequencing program includes a plurality of ramp opcodes that defines the plurality of frequency ramps and a firmware opcode configured to trigger a firmware call, and wherein each ramp opcode of the plurality of ramp opcodes defines a respective timing for a respective frequency ramp such that the predetermined time dependency for each frequency ramp relative to the other frequency ramps of the plurality of frequency ramps is maintained; a second memory configured to store a firmware program corresponding to the firmware opcode of the sequencing program; a sequencer configured to read the sequencing program from the first memory, derive control values for the plurality of ramp parameters based on the plurality of ramp opcodes, provide the control values to the ramp signal generator, and provide a start signal to start an execution of the firmware call in response to reading the firmware opcode in the sequencing program; and a central processing unit (CPU) configured to receive the start signal from the sequencer and, in response to the start signal to start the execution of the firmware call, execute the firmware program from the second memory in parallel to the ramp signal generator generating the frequency-modulated ramp signal, wherein the ramp signal generator is configured to receive the control values and generate the plurality of frequency ramps based on the control values.

In some implementations, a radar semiconductor chip includes a ramp signal generator configured to generate a frequency-modulated ramp signal comprising a plurality of frequency ramps of a ramp scenario, wherein the ramp signal generator is configured to generate the plurality of frequency ramps according to a plurality of ramp parameters; a first memory configured to store a sequencing program associated with generating the frequency-modulated ramp signal, wherein the sequencing program includes a plurality of ramp opcodes configured to define the plurality of frequency ramps and a firmware opcode configured to trigger a firmware call; a second memory configured to store a firmware program corresponding to the firmware opcode of the sequencing program; a sequencer configured to read the sequencing program from the first memory, derive control values for the plurality of ramp parameters based on the plurality of ramp opcodes, provide the control values to the ramp signal generator, and provide a start signal to start an execution of the firmware call in response to reading the firmware opcode in the sequencing program; and a CPU configured to receive the start signal from the sequencer and, in response to the start signal, execute the firmware program from the second memory in parallel to the ramp scenario, wherein the ramp signal generator is configured to receive the control values and generate the plurality of frequency ramps based on the control values.

In some implementations, a method for controlling a radar circuit of a radar semiconductor chip includes storing, in a first memory, a sequencing program associated with generating a frequency-modulated ramp signal, wherein the sequencing program includes a plurality of ramp opcodes configured to define a plurality of frequency ramps of the frequency-modulated ramp signal, and a firmware opcode configured to trigger a firmware call, and wherein the plurality of ramp opcodes defines a timing for each frequency ramp such that a predetermined time dependency for each frequency ramp relative to other frequency ramps of the plurality of frequency ramps is maintained; storing, in a second memory, a firmware program corresponding to the firmware opcode of the sequencing program; reading, by a sequencer, the sequencing program from the first memory; deriving, by the sequencer, control values for a plurality of ramp parameters based on the plurality of ramp opcodes, providing, by the sequencer, the control values to a ramp signal generator configured to generate the frequency-modulated ramp signal; triggering, by the sequencer, the firmware call in response to reading the firmware opcode in the sequencing program; in response to the firmware call, executing, by a CPU, the firmware program from the second memory in parallel with a generation of the frequency-modulated ramp signal by the ramp signal generator; and generating, by a ramp generator, the frequency-modulated ramp signal based on the control values, wherein the frequency-modulated ramp signal is generated in parallel with an execution of the firmware program by the CPU, and wherein each frequency ramp is generated with the predetermined time dependency relative to each other frequency ramp of the plurality of frequency ramps in accordance with the plurality of ramp opcodes.

BRIEF DESCRIPTION OF THE DRAWINGS

Implementations are described herein making reference to the appended drawings.

DETAILED DESCRIPTION

Figure 1:
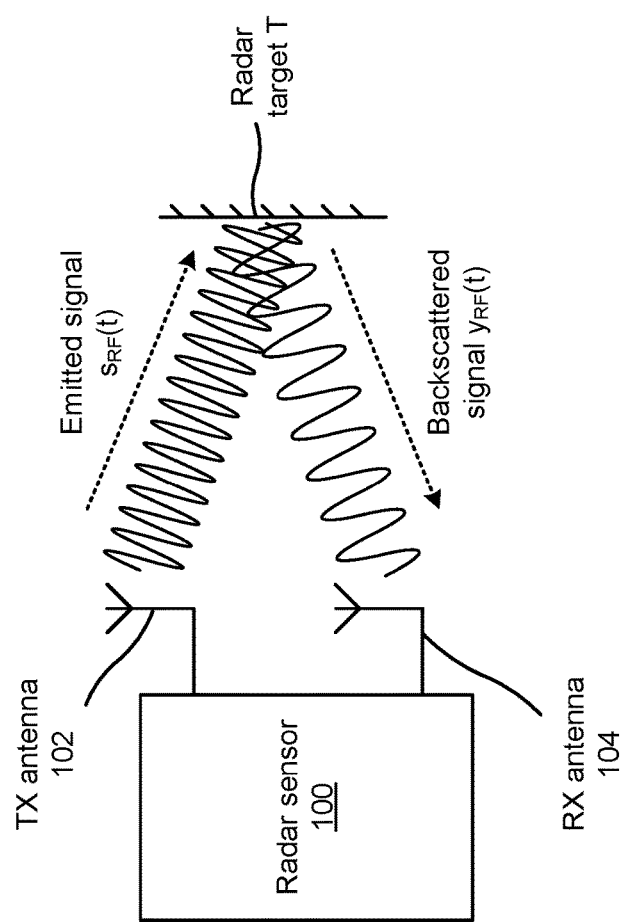
FIG. 1 is a diagram of an example application of a frequency-modulated continuous-wave (FMCW) radar sensor.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A radar MMIC, sometimes referred to as a single radar chip, may incorporate all core functions of a radio frequency (RF) frontend of a radar transceiver (e.g., local oscillator, power amplifiers, low-noise amplifiers (LNAs), mixers, etc.), analog preprocessing of the intermediate frequency (IF) or baseband signals (e.g., filters, amplifiers, etc.), and analog-to-digital conversion in one single package. The RF frontend usually includes multiple reception (RX) and transmission (TX) channels, particularly in applications in which beam steering techniques, phased antenna arrays, etc., are used. In radar applications, phased antenna arrays may be employed to sense an incidence angle of incoming RF radar signals (also referred to as "direction of arrival" or DOA).

A microcontroller may act as a supervisor for a radar MMIC by sending commands and receiving responses over one or more communication channels (e.g., a bus system, such as a serial peripheral interface (SPI)). As a result, the radar MMIC may be controlled by the microcontroller.

Frequency-modulated continuous-wave (FMCW) radar applications rely on transmitting multiple frequency sweeps in a time-controlled manner. For example, the radar MMIC may include a ramp signal generator that is configured to generate a frequency-modulated ramp signal (e.g., an FMCW ramp signal) that includes a plurality of frequency ramps of a ramp scenario. In addition to generating the frequency-modulated ramp signal, the radar MMIC may be responsible for performing several on-chip functions, such as temperature monitoring, power or phase monitoring, receiver gain monitoring, decimation rate reconfiguration, and/or interference mitigation actions. The on-chip functions should be performed synchronously to a transmission of the frequency ramps or should be performed between different frequency ramp sequences of the ramp scenario. In some cases, the on-chip functions should be performed without disrupting timing relationships between individual frequency ramps and/or between the different frequency ramp sequences of the ramp scenario. However, performing one or more on-chip functions can cause delays in generating the frequency ramps (e.g., as the radar MMIC waits for an on-chip function to be completed before resuming further frequency ramps), which may disrupt the timing relationships between the individual frequency ramps and/or between the different frequency ramp sequences of the ramp scenario.

Some implementations disclosed herein are directed to a radar MMIC that is configured to maintain cycle-accurate time control between individual frequency ramps and/or between the different frequency ramp sequences of the ramp scenario. For example, one or more on-chip functions may be implemented in firmware (FW) and executed by a central processing unit (CPU), which may save costs and development-time compared to implementing the on-chip functions fully in hardware (HW) logic. A sequencer may read a sequencing program that is associated with generating a frequency-modulated ramp signal based on ramp operation codes (opcodes) of the sequencing program. The sequencing program may also include at least one firmware opcode configured to trigger a firmware call. The sequencer may be configured to read the sequencing program from a first memory, derive control values for a plurality of ramp parameters based on the ramp opcodes, provide the control values to the ramp signal generator for generation of the frequency-modulated ramp signal, and provide a start signal to start an execution of the firmware call in response to reading the firmware opcode in the sequencing program. In addition, the CPU may be configured to receive the start signal from the sequencer and, in response to the start signal to start the execution of the firmware call, execute the firmware program from a second memory in parallel to the ramp signal generator generating the frequency-modulated ramp signal.

Accordingly, a programming model is provided that enables the sequencer to call FW functions and/or FW commands. The firmware calls defined within the sequencing program are embedded in the sequencing program. The firmware calls may be started and executed in parallel to a generation of the frequency-modulated ramp signal.

For example, while executing the sequencing program, the sequencer is able to call firmware commands synchronously to a current executed ramp segment in the ramp scenario. Therefore, a selected ramp segment may define a start of the firmware call. In some cases, a long wait ramp segment is configured between different frequency ramp sequences, and a firmware call is synchronous with the long wait ramp segment in order to preserve the cycle-accurate timing between the different frequency ramp sequences. During a wait ramp segment, a frequency of the frequency-modulated ramp signal may be held constant such that no frequency ramps are generated during the wait ramp segment.

When a firmware call is to be triggered next to an executed ramp segment, the sequencer may provide a trigger signal to the CPU. This trigger signal may be used to notify the CPU that the firmware call is pending and that information (e.g., data) is ready to be fetched by the CPU from the sequencer (e.g., from the sequencing program). The information can be fetched by the CPU by accessing a first-in first-out (FIFO) hardware buffer of the sequencer via a data bus or by direct memory access to a memory of the sequencer. For the direct memory access, a memory location used to fetch the information from the memory of the sequencer may be provided to the CPU via data bus registers. After all information of the firmware opcode is fetched by the CPU, the CPU may start execution of the firmware.

One or more of the following advantages may be realized using the programming model: cycle-accurate triggering of firmware execution while performing sequencing by the sequencer, cycle-accurate start of a next ramp sequence with firmware execution in between ramp sequences, batching ramp sequences via firmware (e.g., reprogramming of a hardware data bus register on-the-fly), and no interruption of a ramp sequence for performing firmware command execution.

While performing hardware-controlled sequencing according to the sequencing program, the firmware calls provide support for all radar internal functionality that depends on firmware, such as: transmitter and/or receiver monitoring, transmitter and/or receiver calibration, configuration changes (e.g., receiver decimation rate changes), interference mitigation (e.g., RF-band selection sensed via firmware and changes to a frequency band on-the-fly), and register container settings. Therefore, functionality that may be too complex to be efficiently implemented fully in hardware (e.g., into hardware logic) may be embedded into the sequencing program, while still maintaining cycle-accurate execution of the sequencing program.

Moreover, while the firmware calls run parallel to the frequency-modulated ramp signal (e.g., an execution of the firmware by the CPU runs in parallel to execution of the sequencing program by the sequencer), execution of the firmware should be synchronous to the overall sequencing program. Thus, some implementations may be directed to performing checking (e.g., checkpointing) whether an execution duration of the firmware is completed prior to a timing event to ensure that cycle-accurate time control between individual frequency ramps and/or between the different frequency ramp sequences of the ramp scenario is maintained. For example, checkpointing may be used to ensure that the execution of the firmware has finished prior to chirping starting again. "Chirping" refers to a generation of a sequence of frequency ramps in the frequency-modulated ramp signal. Therefore, a checkpoint mechanism may be used to check whether the execution of firmware initiated by a firmware opcode has finished prior to a next sequence of frequency ramps.

FIG. 1 is a diagram illustrating an example application of an FMCW radar sensor in the form of a radar sensor 100 for measuring distances, velocities, or angles of arrival (AoAs) associated with objects, also referred to as targets. As shown in FIG. 1, the radar sensor 100 may have one or more TX antennas 102 and one or more RX antennas 104. In some implementations, a single antenna may be used that serves simultaneously as a TX antenna 102 and as an RX antenna 104.

In operation, the TX antenna 102 continuously emits an RF signal $s_{RF}(t)$ (also referred to as a transmitted radar signal), which is frequency-modulated, for example, by a periodic linear frequency ramp signal (also referred to as a frequency sweep or chirp signal). The transmitted radar signal $s_{RF}(t)$ is backscattered at a target T and a reflected signal $y_{RF}(t)$ (e.g., a back-scattered signal, an echo signal, a received RF signal, or a received radar signal) is received by the RX antenna 104. FIG. 1 shows a simplified example—in practice, the radar sensor 100 may include a plurality of TX antennas 102 and RX antennas 104 to be able to determine an AoA of the received RF signal $y_{RF}(t)$ and, therefore, locate the target T with increased accuracy as compared to a radar sensor that may use a single TX antenna and/or a signal RX antenna.

It will be appreciated that "(t)" denotes an analog signal defined as a continuous-time signal that may change over a time period t, and "[n]" denotes a digital signal defined as a discrete-time signal, where n is an integer and may represent an nth sample or a signal containing n samples. A signal may be represented with or without its continuous-time or discrete-time domain identifier (t) and [n], respectively. It will be further appreciated that RF circuits, such as the radar sensor 100, may be used in fields other than radar. For example, RF circuits may be used in RF communication systems. Accordingly, in some implementations, the radar sensor 100 may be used in RF applications other than radar, such as RF communications.

As indicated above, FIG. 1 is provided as an example. Other examples may differ from what is described with regard to FIG. 1.

Figure 2:
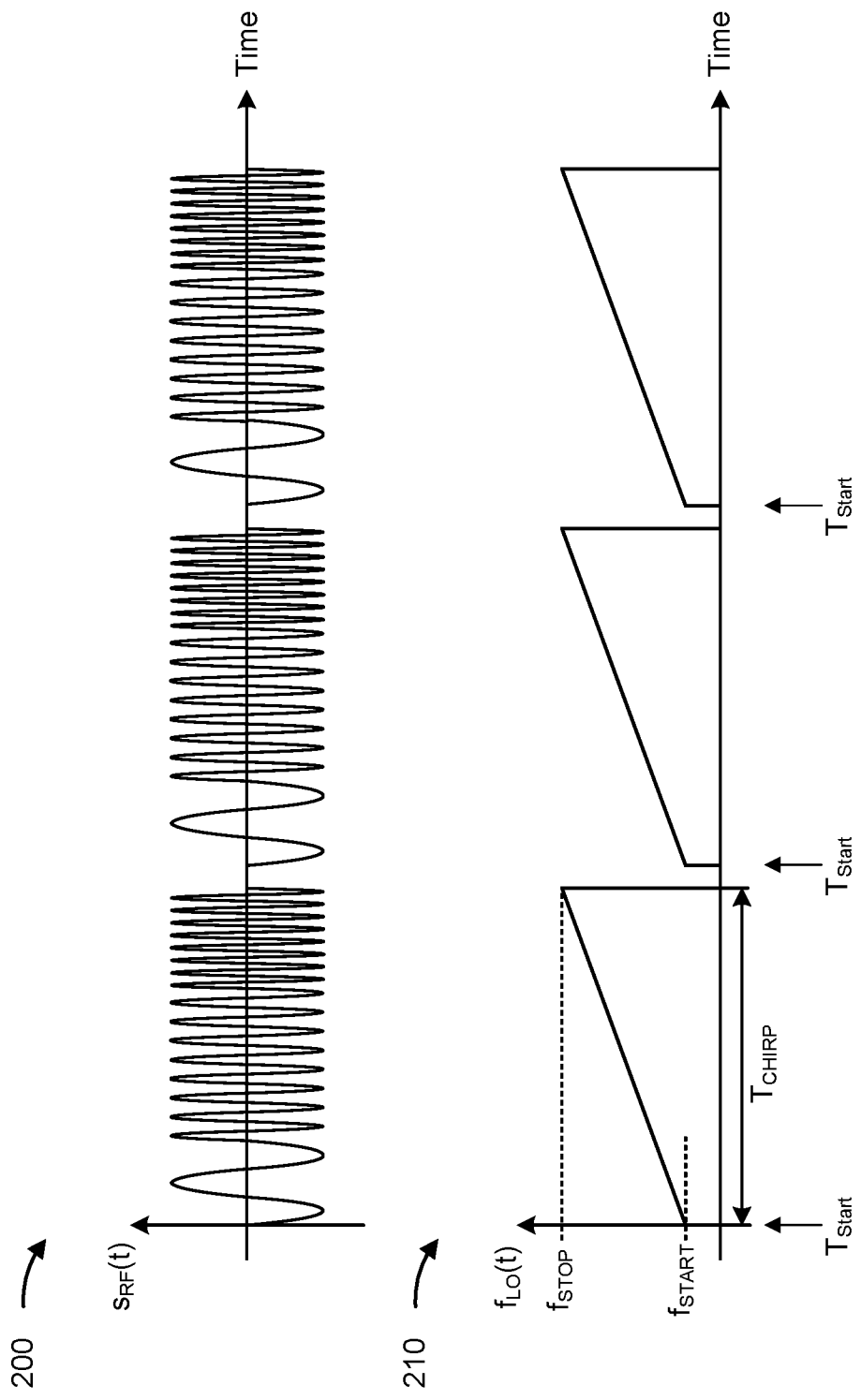
FIG. 2 illustrates an example of frequency modulation of a transmitted radar signal transmitted by the FMCW radar sensor.

FIG. 2 illustrates an example of the frequency modulation of the RF signal $s_{RF}(t)$. As illustrated in the upper diagram 200 of FIG. 2, the RF signal $s_{RF}(t)$ comprises a plurality of frequency ramps or a series of "chirps"; that is to say, the RF signal $s_{RF}(t)$ comprises a sequence of sinusoidal signal profiles (e.g., waveforms) with a rising frequency (referred to as an up-chirp) or a falling frequency (referred to as a down-chirp). In the example shown in FIG. 2, the instantaneous frequency $f_{LO}(t)$ of a chirp increases linearly, from a start frequency $f_{START}$ to a stop frequency $f_{STOP}$ within a time interval $T_{CHIRP}$, as shown in the lower diagram 210 of FIG. 2. Such chirps are also referred to as linear frequency ramps. For a measurement, a sequence of frequency ramps is emitted, and a resulting echo signal is evaluated in baseband to detect one or more radar targets.

A frequency-modulated ramp signal, such as a local oscillator signal used for generating a radar signal, may include a plurality of radar frames, which may also be referred to as radar operation cycles or chirp frames. A sequence of ramps may make up each radar frame. For example, a radar operation cycle may include several hundreds of radar ramps (sweeps) taking up to 10-30 milliseconds (ms) in total. A frame length of the radar frame may correspond to one radar operation cycle. Consecutive ramps may have a short pause therebetween, and a longer pause may be used between consecutive radar frames. The longer pause between consecutive radar frames may be referred to as a configuration interval, during which one or more ramp parameters of the RF signal $s_{RF}(t)$ can be adjusted for subsequent radar frames. A ramp start time $T_{START}$ indicates a start time for each chirp and may occur at a predetermined interval according to, for example, a number of clock cycles.

The start frequency $f_{START}$ and stop frequency $f_{STOP}$ of the ramps may be within a frequency band with minimum frequency Fmin and maximum frequency Fmax. As a result, the minimum frequency Fmin and the maximum frequency Fmax define an operating frequency range or a frequency band usable for the ramping signals, and thus the frequency range or the frequency band of the radar application of a radar MMIC. In some implementations, the frequency range defined by a single ramp having start and stop frequencies $f_{START}$ and $f_{STOP}$ may be smaller than the usable radar frequency band. However, all ramps that are generated during operation may lie between the frequencies Fmin and Fmax of the radar frequency band (e.g., between 76-81 GHz) used for generating the ramping signals.

FIG. 2 illustrates three identical linear frequency ramps or chirps. However, the parameters $f_{START}$, $f_{STOP}$, $T_{CHIRP}$, and/or the pause between the individual frequency ramps may vary depending on the actual implementation and/or use of the radar sensor 100. In practice, the frequency variation may be, for example, linear (linear ramp, frequency ramp), exponential (exponential ramp), or hyperbolic (hyperbolic ramp). In some implementations, the frequency may decrease instead of increase during time interval $T_{CHIRP}$. Furthermore, in some implementations, a center frequency of each ramp (and therefore $f_{START}$ and $f_{STOP}$) may vary (e.g., from ramp to ramp or after detecting an interference) to allow using the full or a part of the frequency band. In one example, the frequency band has a minimum frequency Fmin of 76 gigahertz (GHz) and a maximum frequency Fmax of 81 GHz.

Thus, while three identical linear frequency ramps or chirps with the same start frequency $f_{START}$ and stop frequency $f_{STOP}$ are illustrated in FIG. 2, the start frequency $f_{START}$ and stop frequency $f_{STOP}$ may vary within a radar frame or across multiple radar frames. A local oscillator signal $S_{LO}(t)$ may be used to generate the RF signal SRF(t). Thus, it can be said that the local oscillator signal $S_{LO}(t)$ and the RF signal SRF(t) are frequency-modulated ramp signals that are generated within an operating frequency range (e.g., a predefined radar frequency range). For example, the local oscillator signal $S_{LO}(t)$ may be a frequency-modulated ramp signal that includes a plurality of frequency ramps, each starting at a respective ramp start frequency and ending at a respective ramp stop frequency, and the respective ramp start frequencies and the respective ramp stop frequencies of the plurality of frequency ramps define a frequency range within the bounds of the operating frequency range. The frequency range of the plurality of frequency ramps may be defined by the lowest start frequency $f_{START}$ and the highest stop frequency $f_{STOP}$ among the frequency ramps in a given time interval (e.g., in an implementation in which the frequency increases within each frequency ramp). As noted above, the start frequency $f_{START}$ and the stop frequency $f_{STOP}$ of a sequence of frequency ramps may be the same, and thus the center frequency of each ramp may be constant. Alternatively, the center frequency of each ramp (and therefore $f_{START}$ and $f_{STOP}$) may vary from ramp to ramp or after detecting an interference. The bandwidth (e.g., frequency range) of each ramp may also vary from ramp to ramp or after detecting an interference.

As indicated above, FIG. 2 is provided as an example. Other examples may differ from what is described with regard to FIG. 2.

Figure 3:
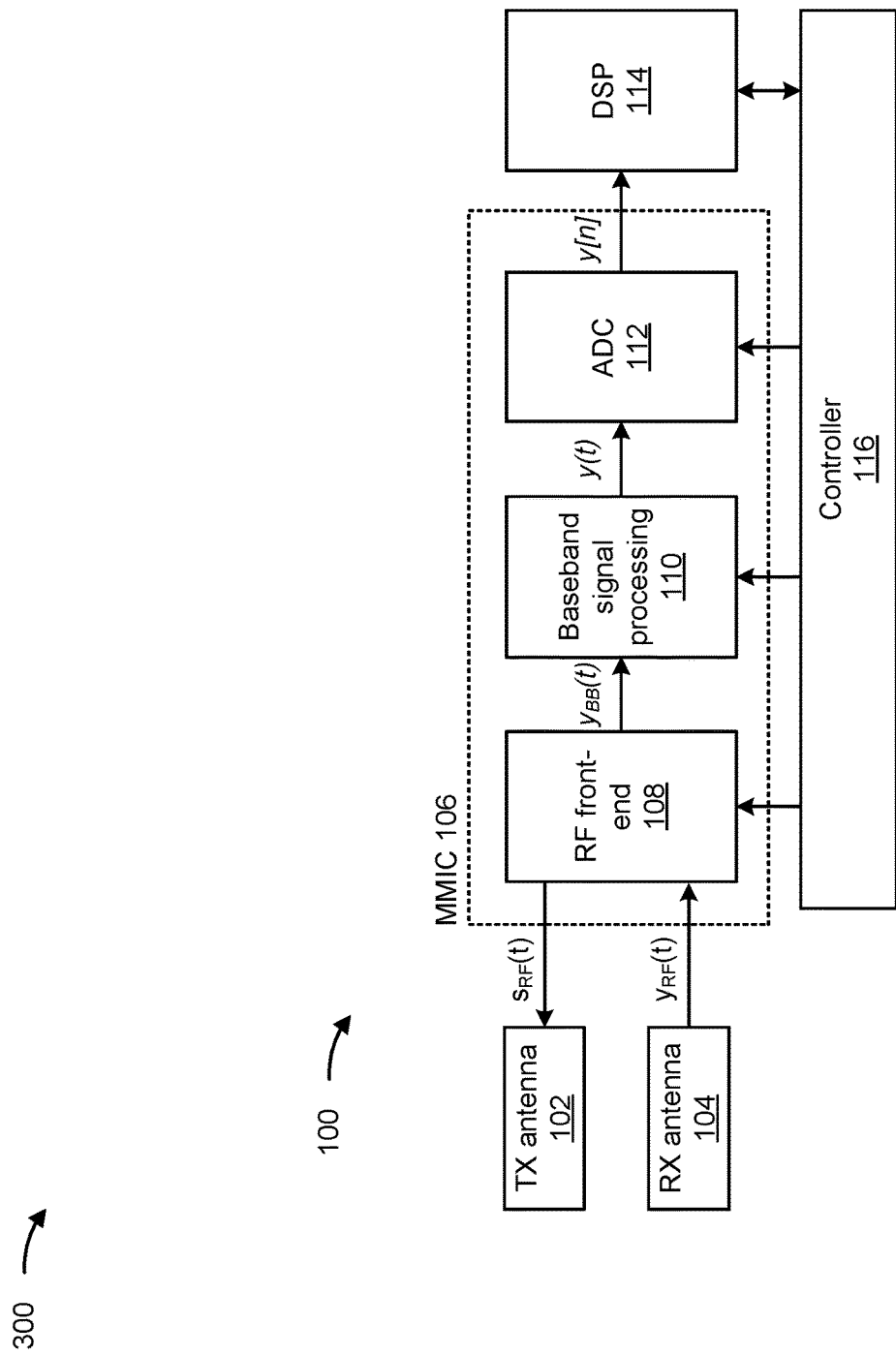
FIG. 3 is a block diagram that illustrates an example structure of the FMCW radar sensor.

FIG. 3 is a block diagram that illustrates an example structure of the radar sensor 100. As shown, the radar sensor 100 may include one or more TX antennas 102, one or more RX antennas 104, a radar MMIC 106 (comprising an RF front-end 108, a baseband signal processing circuit 110, and an analog-to-digital converter (ADC) 112), a digital signal processor (DSP) 114, and a controller 116. In some implementations, the MMIC may include a digital front-end (DFE) coupled downstream from the ADC 112. The digital front-end may include circuit components associated with performing signal processing on a digital signal generated by the ADC 112 (e.g., digital filtering). In some cases, the DFE may include the DSP 114.

In the radar sensor 100, the one or more TX antennas 102 and the one or more RX antennas 104 are connected to the RF front-end 108. The RF front-end 108 may include circuit components associated with performing RF signal processing. These circuit components may include, for example, a local oscillator (LO), one or more RF power amplifiers, one or more LNAs, one or more directional couplers (e.g., rat-race couplers, circulators, or the like), or one or more mixers for downmixing (e.g., down-converting or demodulating) RF signals into baseband or an intermediate frequency band (IF band). The RF front-end 108 may be integrated into the radar MMIC 106 with one or more other components, as shown in FIG. 3. The IF band is sometimes also referred to as baseband. Accordingly, "baseband" and "IF band" may be used interchangeably herein. Baseband signals are those signals on the basis of which radar targets are detected.

Antenna arrays may be used instead of single antennas. The depicted example shows a bistatic (or pseudo-monostatic) radar system, which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX and RX channels, which allows for measurement of the direction (e.g., direction of arrival) from which the radar echoes are received.

In some implementations, the radar sensor 100 may include a plurality of TX antennas 102 and a plurality of RX antennas 104, which enables the radar sensor 100 to measure an AoA from which radar echoes are received. In the case of such systems, individual TX channels and RX channels may be constructed identically or similarly and may be distributed over one or more radar MMICs 106.

In some implementations, a signal emitted by the TX antenna 102 may be in a range from approximately 20 GHz to approximately 100 GHz, such as in a range between approximately 76 GHz and approximately 81 GHz. As mentioned, a radar signal received by the RX antenna 104 includes radar echoes (e.g., chirp echo signals); that is to say, those signal components that are backscattered at one or more targets.

The received RF signal $y_{RF}(t)$ is downmixed into, for example, baseband to generate a baseband signal $y_{BB}(t)$, and the baseband signal $y_{BB}(t)$ is processed further in baseband by way of analog signal processing performed by the baseband signal processing circuit 110. In some implementations, the baseband signal processing circuit 110 may be configured to filter and/or amplify the baseband signal $y_{BB}(t)$ to generate an analog (baseband) output signal y(t) that is derived from the baseband signal $y_{BB}(t)$. The baseband signal $y_{BB}(t)$ may also be referred to as analog radar data. If the received RF signals are down-converted into the IF band, the baseband signal processing circuit 110 may be referred to as an IF signal processing circuit. Thus, the baseband signal processing circuit 110, in general, may also be referred to as an analog signal processing circuit.

The ADC 112 may be configured to digitize the baseband signal $y_{BB}(t)$ or the analog output signal y(t) to generate a digital baseband signal y[n], also referred to as a digital output signal. The digital baseband signal y[n] is representative of the radar data received in the received RF signal $y_{RF}(t)$. The DSP 114 may be configured to further process the digital baseband signal y[n] in the digital domain. For example, the DSP 114 may be configured to receive the digital radar data in the digital baseband signal y[n] and process the digital radar data using the ramp parameters (e.g., respective ramp start frequencies, the respective ramp stop frequencies, a bandwidth of a frequency range, a ramp start time, or a sampling start time) used to generate the respective frequency ramps of the received RF signal $y_{RF}(t)$ in order to generate a range Doppler map, which may then be further used by the DSP 114 for object detection, classification, and so on.

In some implementations, the controller 116 is configured to control operation of the radar sensor 100 (e.g., by controlling one or more other components of the radar sensor 100, as indicated in FIG. 3). The controller 116 may include, for example, a microcontroller unit (MCU).

In some implementations, the RF front-end 108, the baseband signal processing circuit 110, the ADC 112, and/or the DSP 114 may be integrated in a single radar MMIC 106 (e.g., an RF semiconductor chip). Alternatively, two or more of these components may be distributed over multiple radar MMICs 106. In some implementations, the DSP 114 may be included in the controller 116. In some implementations, the techniques associated with TX monitoring and/or RX monitoring may be performed by one or more components of the radar sensor 100, such as by the DSP 114, the controller 116, or the like.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components (e.g., one or more devices or components) shown in FIG. 3 may perform one or more functions described as being performed by another set of devices or components shown in FIG. 3.

Figure 4:
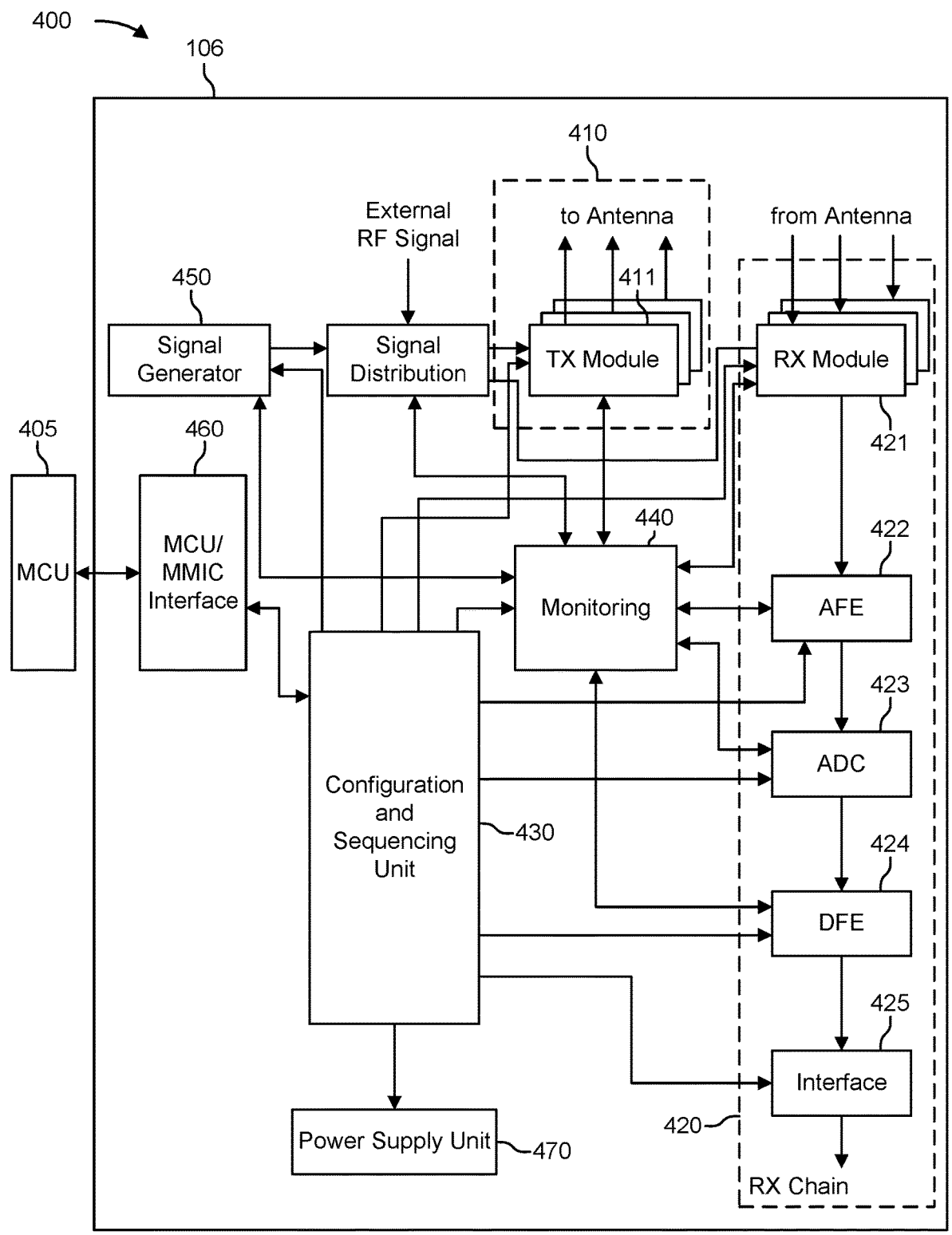
FIG. 4 shows a schematic block diagram of a radar system according to one or more embodiments.

FIG. 4 shows a schematic block diagram of a radar system 400 according to one or more implementations. The radar system 400 includes the radar MMIC 106 (e.g., a semiconductor chip) and an MCU 405. The MCU 405 may correspond to the controller 116 described in connection with FIG. 3. The radar MMIC 106 includes a transmitter 410, including at least one transmit channel 411 for transmitting radar signals, and/or at least one receive channel 420 for receiving and processing radar signals (e.g., radar echos). The radar MMIC 106 may further include a sequencer 430, a monitoring circuit 440, a signal generator 450, a controller/MMIC interface 460, and a power supply unit 470.

The transmit channel 411 may include one or more circuit components and is configured to generate radar transmission signals and to output the radar transmission signals to one or more antennas. As indicated in FIG. 4, the transmitter 410 can comprise one or more of the transmit channels 411. The receive channel 420 may include one or more circuit components and is configured to receive and process one or more radar reception signals from one or more antennas. As indicated in FIG. 4, the receive channel 420 can comprise one or more receivers 421, an analog front-end 422, an ADC 423, a digital front-end 424, and an interface 425.

The analog front-end 422 may include all of the circuit components needed for RF signal processing. Such circuit components may (but need not necessarily) include, for example, an LO, RF power amplifiers, LNAs, directional couplers such as rat-race-couplers and circulators, and mixers for the down-conversion of RF signals into the baseband or an IF band.

Antenna arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX channels and reception RX channels, which among other things allows for the measurement of the direction (e.g., DOA) from which the radar echoes are received.

In the case of an FMCW radar system, the transmitted RF signals radiated by the TX antenna may be in the range between approximately 20 GHz and 100 GHz (e.g., in the frequency band 21 to 26 GHz or in the frequency band 76 to 81 GHZ). As mentioned, the RF signal received by the RX antenna includes the radar echoes (for example, the signal back-scattered at the radar targets).

The received RF signals are down-converted into the baseband (or the IF band) and further processed in the baseband using analog signal processing at the analog front-end 422, which basically includes filtering and amplification of the baseband signal. If the received RF signals are down-converted into the IF band, the baseband signal processing chain of the analog front-end 422 may be referred to as an IF signal processing chain. Thus, the processing chain of the analog front-end 422 may, in general, be referred to as an analog signal processing chain.

The baseband signal is finally digitized using the ADC 423 and further processed in the digital domain at the digital front-end 424. The digital front-end 424 includes a digital signal processing chain implemented, for example, in a DSP.

The sequencer 430 (e.g., a sequencing circuit) may be configured to determine a sequencing scheme for time-dependent functions of the transmitter 410 and/or of the receive channel 420, and also to drive circuit elements of the transmit channel 411 and/or of the receive channel 420 in accordance with the sequencing scheme. A time-dependent function of the transmitter 410 and/or of the receive channel 420 may be a function which is to be performed or carried out in a manner temporally coordinated or synchronized with other time-dependent functions of the transmitter 410 and/or of the receive channel 420 in order to ensure correct operation of the radar sensor or radar system. Accordingly, the sequencing scheme represents a temporally coordinated or synchronized order of performance of individual time-dependent functions.

By way of example, the time-dependent functions may include a function of the transmit channel 411 relating to generating a radio-frequency radar transmission signal (e.g., a frequency-modulated ramp signal), a function of the receive channel 420 relating to processing a radio-frequency radar reception signal, a monitoring function for one or more circuit components of the transmit channel 411 and/or of the receive channel 420, a monitoring function for a signal processed by the transmit channel 411 and/or the receive channel 420, or a calibration of a transmit channel 411 and/or a receive channel 420. For example, the time-dependent function may include a transmit calibration function for calibrating the transmit channel 411, a receive calibration function for calibrating the receive channel 420, a transmit monitoring function for monitoring the transmit channel 411, a receive monitoring function for monitoring the receive channel 420, a ramp function for generating ramp segments of a frequency-modulated ramp signal (e.g., of a radar signal), an event monitoring function for monitoring for a trigger event, a read function to read data from a read memory location of the radar MMIC 106, or a write function to write data to a write memory location of the radar MMIC 106.

The sequencer 430 can be implemented, for example, as a dedicated circuit or as a circuit for executing software (e.g., a sequencing program), and configured to determine the sequencing scheme and to drive circuit elements of the transmitter 410 and/or of the receive channel 420 in accordance with the sequencing program. Thus, the sequencing program may be programmed with the sequencing scheme.

In some implementations, the sequencer 430 may include a decoder and a set of first-in first-out (FIFO) buffers. The decoder may be configured to read the sequencing program (e.g., a specific instruction set including a set of opcodes associated with operating the radar device) from a sequencer memory of the sequencer 430, and generate control values and timestamps based at least in part on the sequencing program. A control value may be a value that is to be provided as an input to a component of the radar MMIC 106 at a time indicated by a corresponding timestamp. The component may be any on-chip component of the radar MMIC 106, including but not limited to the transmit channel 411, the receive channel 420, the monitoring circuit 440, and/or the signal generator 450. The control value (and, optionally, the timestamp) may be stored by a FIFO buffer associated with the component, and the FIFO buffer may be configured to provide the control value as the input to the component of the radar MMIC 106 at the time indicated by the timestamp.

In some implementations, the sequencer 430 may include a processing unit, such as a CPU, configured to read the sequencing program from the sequencer memory and execute the sequencing program. Thus, the sequencer 430 may include a memory (e.g., the sequencer memory) that stores the sequencing program for execution by the dedicated circuit and/or by the processing unit.

Radar operations of the at least one transmit channel 411 and/or of the at least one receive channel 420 are controlled centrally by the sequencer 430. Accordingly, the radar operations can be performed substantially autonomously, including independently of external controllers, on account of the sequencing program executed by the sequencer 430.

Furthermore, a frequency-modulated ramp signal includes a plurality of successive signal sections. Configuration ramp parameters for a ramp command may include frequency parameters for the respective signal section indicating a start frequency $f_{START}$, a stop frequency $f_{STOP}$, a time interval $T_{CHIRP}$, phase parameters indicating a phase setting for the transmit signals, a slope of a frequency ramp, and/or a duration of a pause (e.g., a duration of a wait time interval of a wait ramp segment) between adjacent signal sections. By way of example, a signal section can correspond to a ramp segment of a frequency ramp of the radar signal. Some ramp segments may be frequency ramps with a rising frequency (up-ramp) or a falling frequency (down-ramp). Whether a ramp segment is an up-ramp or a down-ramp may be implied by the start frequency and the stop frequency or may be indicated by a configuration parameter.

The radar MMIC 106 can be used, for example, for a (phase- or frequency-) modulated continuous wave radar system. Accordingly, a transmit channel 411 and/or a receive channel 420 can be part of a modulated continuous wave radar system, for example, of an FMCW radar in the automotive field. The sequencer 430 can accordingly be understood as a central sequencing unit which can coordinate substantial time-critical functions of the automotive FMCW radar front-end, such that a radar operation is an autonomous process which, for example, does not necessitate the participation of an external processor for performing the time-critical functions.

In addition to controlling a desired frequency profile of a radar transmission signal, the sequencer 430 can control various other aspects of a radar sensor or radar system in a synchronized manner.

By way of example, in the transmitter 410, and specifically in a transmit channel 411, a power amplifier can be switched on and off in a synchronized manner, or a phase shift (implemented by a phase shifter) of radar transmission signals can be carried out in a synchronized manner.

The monitoring of a transmit channel 411 and/or of a receive channel 420 can be carried out by a monitoring circuit 440. The latter can accordingly be driven by the sequencer 430 to trigger or to activate or deactivate a channel monitoring function in a synchronized manner in accordance with the sequencing scheme. By way of example, monitoring functions can be activated or deactivated in a synchronized manner during a ramp formation, during a calibration (e.g., amplification of a voltage-controlled oscillator), during a cascaded operation, or during a configuration of external components or slaves (e.g., via an SPI or demultiplexing).

The signal generator 450 may include a local oscillator configured to generate the frequency-modulated ramp signal based on control values received from the sequencer 430. The control values may be used to set one or more ramp parameters described herein and implemented by the signal generator 450 to generate the frequency-modulated ramp signal. For example, the ramp parameters implemented by the signal generator 450 may include at least one of a ramp start frequency $f_{START}$ of the frequency-modulated ramp signal, a ramp stop frequency $f_{STOP}$ of the frequency-modulated ramp signal, a ramp frequency difference of the frequency-modulated ramp signal, a ramp time interval of the frequency-modulated ramp signal (e.g., time interval $T_{CHIRP}$), and/or a ramp wait time interval of the frequency-modulated ramp signal.

In the signal generator 450, in a synchronized manner, for example, a bandwidth of a phase-locked loop (PLL) can be set (e.g., charge pump current) or more extensive modulation concepts can be activated or deactivated (e.g., 2-point modulation, resetting current). Likewise, in a synchronized manner, for example, loop filter reset circuits can be activated or deactivated or monitoring functions can be activated or deactivated. Moreover, in a synchronized manner, by way of example, voltages can be roughly set, calibration parameters (e.g., offset current, anti-backlash, amplification of a voltage-controlled oscillator) can be set, or a signal source (e.g., when using a plurality of PLLs) can be selected.

In the receiver 421, in a synchronized manner, by way of example, digital or analog filters can be set (resetting, configuration, bypass, etc.) or decimation rates can be set. Low voltage differential signaling (LVDS) modes or calibrations can be chosen in a synchronized manner. Likewise, in a synchronized manner, the receive channel 420 can also be activated or deactivated in its entirety, or a reception frame delay can be set. By way of example, the ADC 423 can also be configured, calibrated, activated, or deactivated in a synchronized manner.

Likewise, general purpose inputs/outputs (GPIOs) can be configured in a synchronized manner, circuit components for generating frequency ramps can be triggered, or diverse circuit components (e.g., ADC 423) can be switched on or off. Moreover, interrupts can be generated or other chip functionality can be triggered.

In order to synchronize the time-dependent functions presented by way of example above, the sequencer 430 can include an instruction-processing unit (not shown) with a specific instruction set for determining the sequencing scheme. The instruction set can describe the configuration flow over time and be, for example, similar to the instruction set of a general-purpose processor. By way of example, the instruction set can include first specific instructions for the configuration of the circuit elements of a transmit channel 411 and/or of a receive channel 420, and second specific instructions for the configuration of frequency parameters of a radio-frequency radar transmission signal generated by the transmit channel 411.

The sequencer 430 can thus be understood as a radar-specific sequencing unit having an instruction set associated with a specific purpose in order to handle time-critical configurations in a highly integrated radar chip.

A controller/MMIC interface 460 shown in FIG. 4 can additionally be used to transmit commands and responses between the MCU 405 and the sequencer 430 via a communication channel or a communication bus, such as an SPI, an LVDS, or another type of communication interface.

A power supply unit 470 supplies power to the chip components and may be configurable by the sequencer 430.

As indicated above, FIG. 4 is provided as an example. Other examples may differ from what is described with regard to FIG. 4. The number and arrangement of devices and components shown in FIG. 4 are provided as an example. In practice, there may be additional devices or components, fewer devices or components, different devices or components, or differently arranged devices or components than those shown in FIG. 4. Furthermore, two or more devices or components shown in FIG. 4 may be implemented within a single device or component, or a single device or component shown in FIG. 4 may be implemented as multiple, distributed devices or components. Additionally, or alternatively, a set of devices or components (e.g., one or more devices or components) shown in FIG. 4 may perform one or more functions described as being performed by another set of devices or components shown in FIG. 4.

Figure 5:
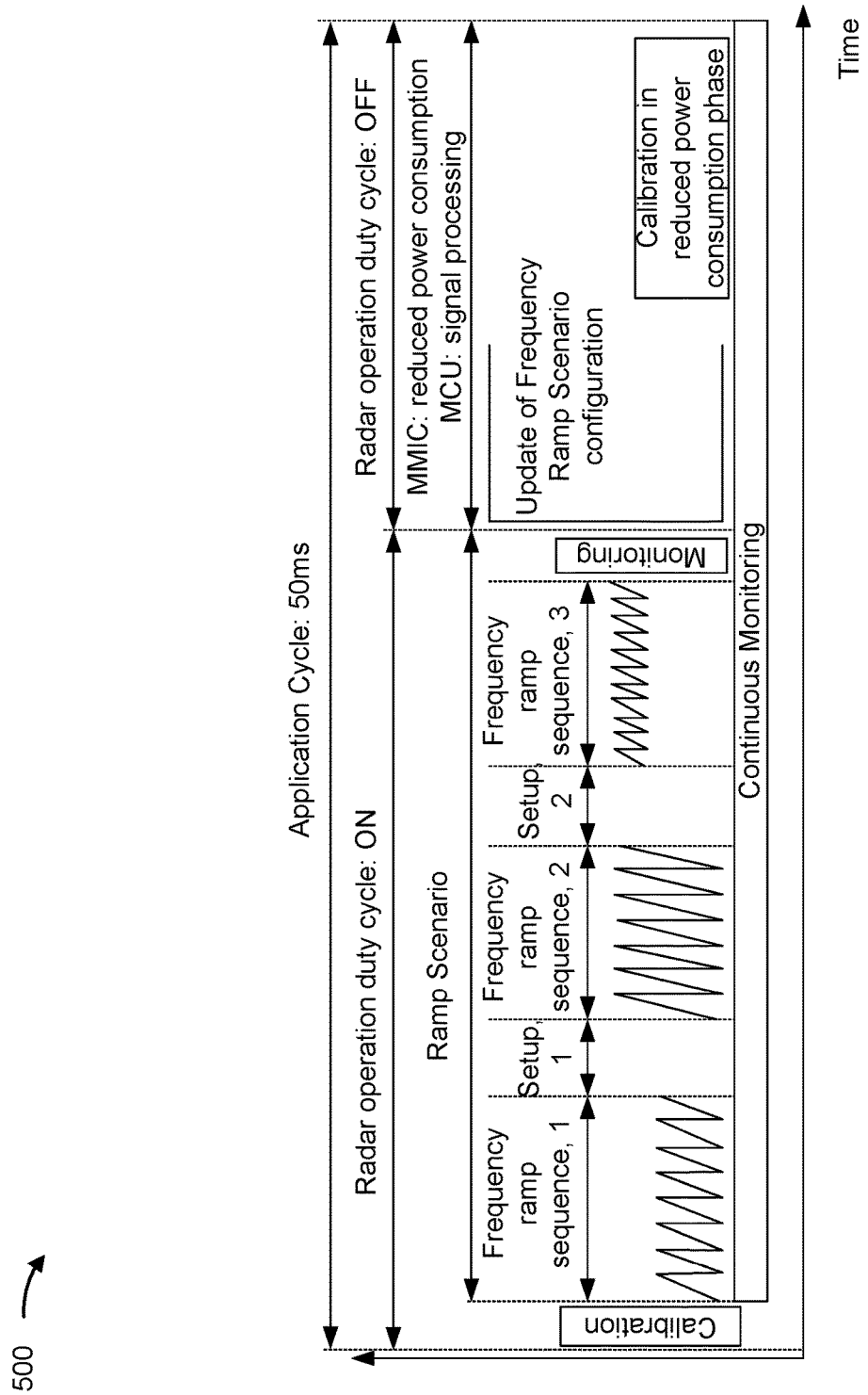
FIG. 5 illustrates an example application cycle according to one or more implementations.

FIG. 5 illustrates an example application cycle 500 according to one or more implementations. The application cycle 500 may include a radar operation duty cycle, including an ON period and an OFF period. During the ON period, the radar MMIC 106 may be configured to perform a warm-up calibration before running a ramp scenario defined by a programming context. In addition, during the ON period, the radar MMIC 106 is configured to perform a ramp scenario during which multiple frequency ramp sequences (e.g., frequency ramp sequence 1, frequency ramp sequence 2, and frequency ramp sequence 3) are transmitted according to ramp parameters defined in associated data of a programming context. In this example, the frequency ramp sequences are generated according to different sets of ramp parameters. Different ramp opcodes in the sequencing program may define the ramp parameters of the frequency ramp sequences. Consecutive frequency ramp sequences may be separated by a long wait ramp segment during which the frequency ramps are not generated (e.g., the frequency of the frequency-modulated ramp signal is held constant or/and no power is radiated at TX antennas).

A setup operation (e.g., setup 1 and setup 2) may be performed by the radar MMIC 106 between frequency ramp sequences (e.g., during the long wait ramp segment). A setup operation may be used to change one or more ramp parameters or may be used to perform a calibration between the frequency ramp sequences.

In addition, during the ON period, the radar MMIC 106 may be configured to perform monitoring for reflected radar signals. During the OFF period, the radar MMIC 106 may continue to monitor for reflected radar signals but may no longer transmit radar signals. As a result, during the OFF period, the radar MMIC 106 may be configured into a reduced power consumption mode. During the OFF period, the MCU 405 may process, via signal processing, the results of the monitoring provided by the radar MMIC 106.

The application cycles may differ in the following ways: by a type of calibration and monitoring that are performed, and which ramp scenario is used. Ramp scenarios include frequency ramp sequences that further include a ramp set (e.g., shown as a triangular waveform). The ramp set may differ in terms of start frequency $f_{START}$, frequency ramp slope, stop frequency $f_{STOP}$, ramp start time $T_{START}$, time interval $T_{CHIRP}$, transmission power, and transmission phase. Additionally, if there are multiple transmit channels, a ramp set may be defined according to which transmit channel is specified for transmitting the ramp set.

As indicated above, FIG. 5 is provided as an example. Other examples may differ from what is described with regard to FIG. 5.

Figure 6:
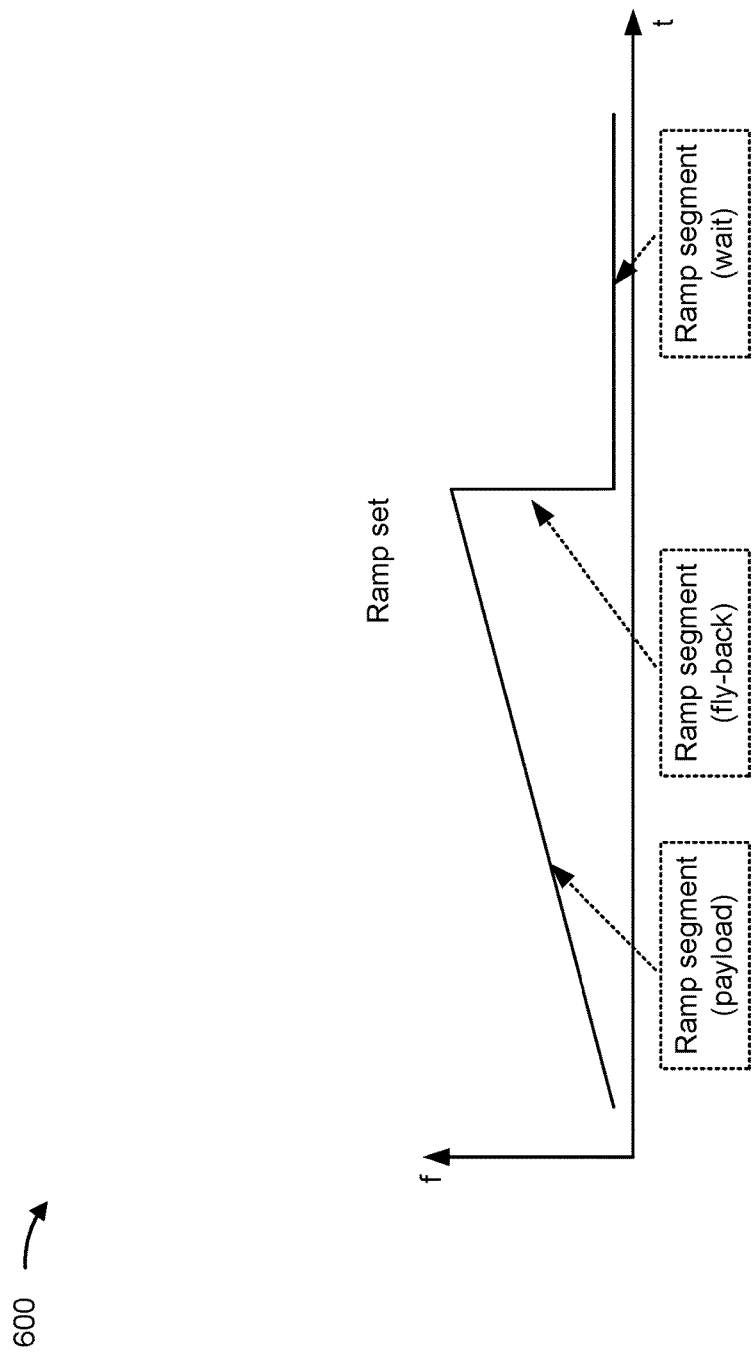
FIG. 6 illustrates an example ramp set according to one or more implementations.

FIG. 6 illustrates an example ramp set 600 according to one or more implementations. A sequence of frequency ramps may be made up of a plurality of ramp sets, with each ramp set corresponding to a respective frequency ramp. Each ramp set 600 of a frequency-modulated ramp signal may include two or more ramp segments, including a payload segment (e.g., the ramp) and a flyback segment during which the frequency transitions from the stop frequency to a wait frequency or to a next start frequency. One or more ramp sets may also include a wait segment that spans a wait interval between successive ramp sets at the wait frequency. An instruction set provided by the sequencing program and read by the sequencer 430 may be used to describe the ramp configuration over time. The instruction set may include specific instructions for each segment of each ramp set of a sequence of ramps. The specific instructions can be embodied as operation codes (opcodes) in the sequencing program. Operation codes directed to controlling one or more ramp parameters may be referred to as ramp opcodes. By way of example, the instruction set can include first specific instructions for the configuration of the circuit elements of a transmit channel and/or of a receive channel and also second specific instructions for the configuration of frequency parameters of a radar transmission signal (i.e., a ramp signal) generated by a ramp sequence generator.

One set of opcodes may be directed to the payload segment of the frequency ramps, one set of opcodes may be directed to the flyback segment of the frequency ramps, and one set of opcodes may be directed to the wait segment of the frequency ramps, with various ramp parameters within each ramp segment being configured according to a respective opcode segment. Loops, including nested loops, may be used to define parameter sets that are performed a predetermined number of times before advancing to a new parameter set. Even more complex segment scenarios are possible— for example, a second payload instead of the flyback segment, or two (or more) payload segments, with or without wait segments between them, followed by one flyback covering all payload segments are also possible.

As indicated above, FIG. 6 is provided as an example. Other examples may differ from what is described with regard to FIG. 6.

Figure 7:
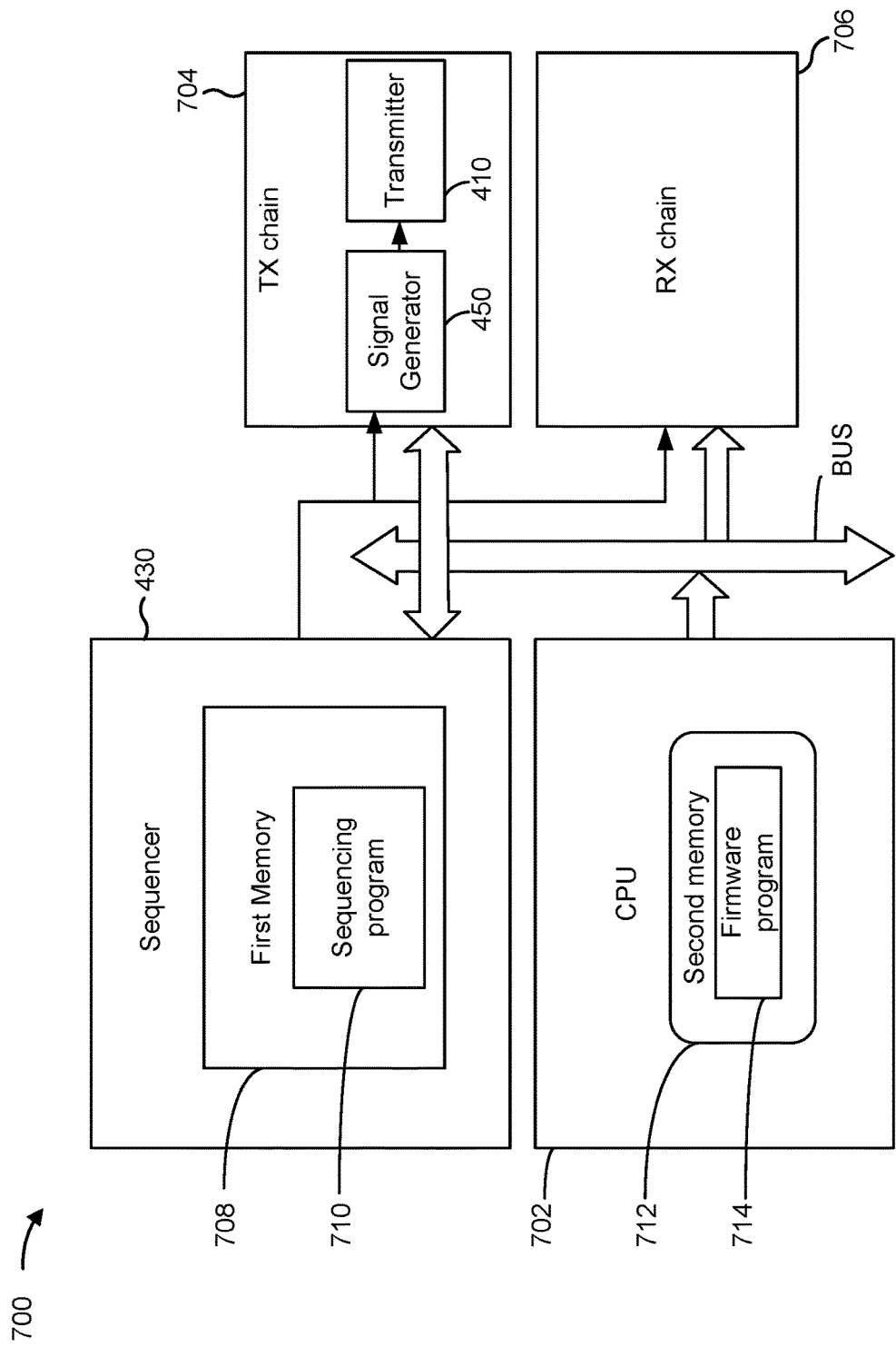
FIG. 7 illustrates a sequencing system according to one or more implementations.

FIG. 7 illustrates a sequencing system 700 according to one or more implementations. The sequencing system 700 may be integrated in the radar MMIC 106. The sequencing system 700 may include the sequencer 430, a CPU 702, a TX chain 704, and an RX chain 706 that are coupled by a bus. The TX chain 704 may include the signal generator 450 and components of the transmitter 410 (e.g., components of at least one transmit channel 411). The RX chain 706 may include components of the receive channel 420.

The signal generator 450 may be configured to generate a frequency-modulated ramp signal that includes a plurality of frequency ramps of a ramp scenario. The signal generator 450 may be configured to generate the plurality of frequency ramps according to a plurality of ramp parameters. Additionally, the signal generator 450 may be configured to generate each frequency ramp with a predetermined time dependency relative to each other frequency ramp of the plurality of frequency ramps. In other words, each frequency ramp may be a time-dependent function that has a predetermined time dependency relative to each other frequency ramp (e.g., each other time-dependent function) of the plurality of frequency ramps.

The plurality of ramp parameters may include at least one of a ramp start frequency of the frequency-modulated ramp signal, a ramp stop frequency of the frequency-modulated ramp signal, a ramp frequency difference of the frequency-modulated ramp signal, a ramp time interval of the frequency-modulated ramp signal, a ramp wait time interval of the frequency-modulated ramp signal, a phase of the frequency-modulated ramp signal, a phase offset of the frequency-modulated ramp signal, a signal output power of the frequency-modulated ramp signal, a filter configuration of a radar circuit component of the radar semiconductor chip, a gain configuration of a radar circuit component of the radar semiconductor chip, a power amplifier configuration of a radar circuit component of the radar semiconductor chip, a sampling start time of a radar circuit component of the radar semiconductor chip, a monitoring configuration of a radar circuit component of the radar semiconductor chip, a chip pin output configuration of the radar semiconductor chip, or data acquisition information of a radar circuit component of the radar semiconductor chip.

The sequencer 430 may include a first memory 708. Alternatively, the first memory 708 may be separate from the sequencer 430 and the sequencer 430 may access the first memory 708 via the bus. The first memory 708 may be configured to store a sequencing program 710 associated with generating the frequency-modulated ramp signal. For example, the sequencing program 710 may include a plurality of ramp opcodes that defines the plurality of frequency ramps and a firmware opcode configured to trigger a firmware call. Each ramp opcode of the plurality of ramp opcodes may define a respective timing for a respective frequency ramp such that the predetermined time dependency for each frequency ramp relative to the other frequency ramps of the plurality of frequency ramps is maintained. The predetermined time dependencies may be fixed or pre-programmed according to a sequencing program 710.

The CPU 702 may include a second memory 712. Alternatively, the second memory 712 may be separate from the CPU 702 and the CPU 702 may access the second memory 712 via the bus. The second memory 712 may be configured to store a firmware program 714 corresponding to the firmware opcode of the sequencing program 710. In addition, the CPU 702 and the sequencer 430 may be communicatively coupled via the bus.

The sequencer 430 may be configured to read the sequencing program 710 from the first memory 708, derive control values for the plurality of ramp parameters based on the plurality of ramp opcodes, provide the control values to the signal generator 450, and provide a start signal to start an execution of the firmware call in response to reading the firmware opcode in the sequencing program 710.

The CPU 702 may be configured to receive the start signal from the sequencer 430 and, in response to the start signal to start the execution of the firmware call, execute the firmware program 714 from the second memory 712 in parallel to the signal generator 450 generating the frequency-modulated ramp signal. In other words, the sequencer 430 continues to read and execute the sequencing program 710 in parallel to the CPU 702 reading and executing the firmware program 714. As a result, the CPU 702 executes the firmware program 714 while the sequencer 430 continues to generate control values based on the ramp opcodes read from the sequencing program 710. For example, the signal generator 450 may be configured to receive the control values and generate the plurality of frequency ramps based on the control values, which may occur in parallel to the execution of the firmware program 714 by the CPU 702.

In response to the start signal, the CPU 702 may be configured to fetch information (e.g., firmware command data) from the firmware opcode from the sequencing program 710, and execute the firmware program 714 from the second memory 712 based on the information fetched from the firmware opcode. For example, the information may correspond to a memory location within the second memory 712 where the firmware program 714 is located. Additionally, or alternatively, the information may include firmware control data corresponding to the execution of the firmware, including timing information corresponding to a start time of the execution of the firmware program 714. For example, the timing information may synchronize the start time of the execution of the firmware program 714 by the CPU 702 with a start time of an execution of a particular ramp opcode of the sequencing program 710 by the sequencer 430. For example, the CPU 702 may be configured to execute the firmware program 714 synchronously with an execution of a ramp segment of the frequency-modulated ramp signal. The ramp segment may be defined by a ramp opcode of the plurality of ramp opcodes that follows the firmware opcode in the sequencing program 710. In some implementations, the execution of the firmware program 714 may be synchronized with the execution of the ramp opcode that immediately follows the firmware opcode in the sequencing program 710.

The frequency-modulated ramp signal corresponding to the ramp scenario comprises a plurality of ramp segments. For example, each ramp set may include two or three ramp segments. Each ramp opcode of the plurality of ramp opcodes may define a corresponding ramp segment of the plurality of ramp segments. The CPU 702 may be configured to execute the firmware program 714 synchronously with an execution of a ramp segment of the ramp scenario. The ramp segment is defined by a ramp opcode of the plurality of ramp opcodes that follows the firmware opcode in the sequencing program 710. For example, a start time for executing the ramp segment by the sequencer 430 may be synchronous with a start time for executing the firmware program 714 by the CPU 702.

In some implementations, the sequencer 430 may be configured to generate the start signal synchronously with executing a ramp opcode of the plurality of ramp opcodes that immediately follows the firmware opcode in the sequencing program 710. As a result, the firmware call may start when the ramp opcode that immediately follows the firmware opcode is executed by the sequencer 430.

The ramp scenario may include a plurality of ramp sequences that provide the plurality of frequency ramps. Each ramp sequence may include a sequence of frequency ramps. Furthermore, consecutive ramp sequences may be separated by a wait segment (e.g., a long wait ramp segment). The CPU 702 may be configured to execute the firmware program 714 synchronously with the wait segment based on the sequencing program 710. The wait segment may be defined by a first ramp opcode of the plurality of ramp opcodes that follows the firmware opcode in the sequencing program 710.

In some implementations, the sequencer 430 may be configured to perform checkpointing by determining whether an execution of the firmware program 714 by the CPU 702 has been completed prior to an execution start time of a second ramp opcode that follows the first ramp opcode in the sequencing program 710. For example, the sequencer 430 may be configured to determine whether the execution of the firmware program 714 by the CPU 702 has been completed prior to an end of the wait segment and/or prior to a start of a next ramp sequence that follows the wait segment. The CPU 702 may be configured by the firmware call to execute the firmware program 714 synchronously with an execution of the first ramp opcode.

The sequencer 430 may be configured to initiate one or more functions if the sequencer 430 determines that the execution of the firmware program 714 by the CPU 702 has not been completed prior to a target time (e.g., prior to the execution start time of the second ramp opcode). The sequencer 430 may perform the one or more functions in order to maintain the timing for each frequency ramp such that the predetermined time dependency for each frequency ramp relative to the other frequency ramps of the plurality of frequency ramps is preserved.

For example, the sequencer 430 may generate an error signal in response to determining that the execution of the firmware program 714 by the CPU 702 has not been completed prior to the execution start time of the second ramp opcode. Additionally, or alternatively, the sequencer 430 may be configured to monitor an execution progress of the firmware program 714 by the CPU 702 and disregard an execution of the firmware program 714 if the firmware program 714 has not been completed prior to an end of the execution of the first ramp opcode or if the firmware program 714 has not been completed prior to the execution start time of the second ramp opcode. Additionally, or alternatively, the sequencer 430 may be configured to terminate an execution of the firmware program 714 by the CPU 702 in response to determining that the execution of the firmware program 714 has not been completed prior to the execution start time of the second ramp opcode.

In some implementations, the sequencing program 710 may include two or more firmware opcodes, with each firmware opcode corresponding to a different firmware program stored in the second memory 712. In some implementations, two firmware opcodes may be adjacent opcodes in the sequencing program 710. For example, the sequencing program 710 may include a first firmware opcode configured to trigger a first firmware call and a second firmware opcode configured to trigger a second firmware call, and the second firmware opcode may be adjacent to the first firmware opcode in the sequencing program 710. Accordingly, the firmware program described above may be a first firmware program, and the second memory 712 may be configured to store a second firmware program corresponding to the second firmware opcode of the sequencing program 710. The sequencer 430 may be configured to provide an additional start signal to start an execution of the second firmware call in response to reading the second firmware opcode in the sequencing program 710. The CPU 702 may be configured to receive the additional start signal from the sequencer 430 and, in response to the additional start signal, execute the second firmware program from the second memory 712 in parallel to the signal generator 450 generating the frequency-modulated ramp signal.

As indicated above, FIG. 7 is provided as an example. Other examples may differ from what is described with regard to FIG. 7. The number and arrangement of devices and components shown in FIG. 7 are provided as an example. In practice, there may be additional devices or components, fewer devices or components, different devices or components, or differently arranged devices or components than those shown in FIG. 7. Furthermore, two or more devices or components shown in FIG. 7 may be implemented within a single device or component, or a single device or component shown in FIG. 7 may be implemented as multiple, distributed devices or components. Additionally, or alternatively, a set of devices or components (e.g., one or more devices or components) shown in FIG. 7 may perform one or more functions described as being performed by another set of devices or components shown in FIG. 7.

Figure 8:
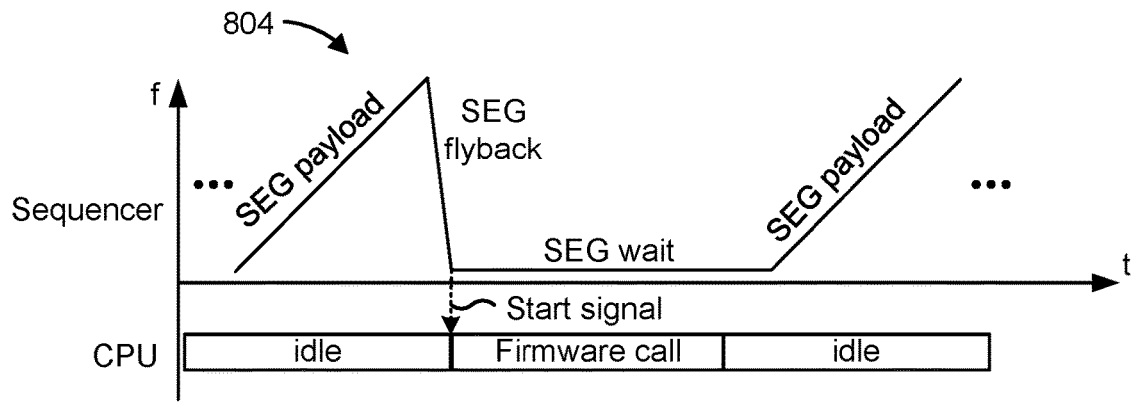
FIG. 8 illustrates a diagram of parallel operations performed by a sequencer and a CPU, respectively, that are performed according to a sequencing program.
Figure 8:
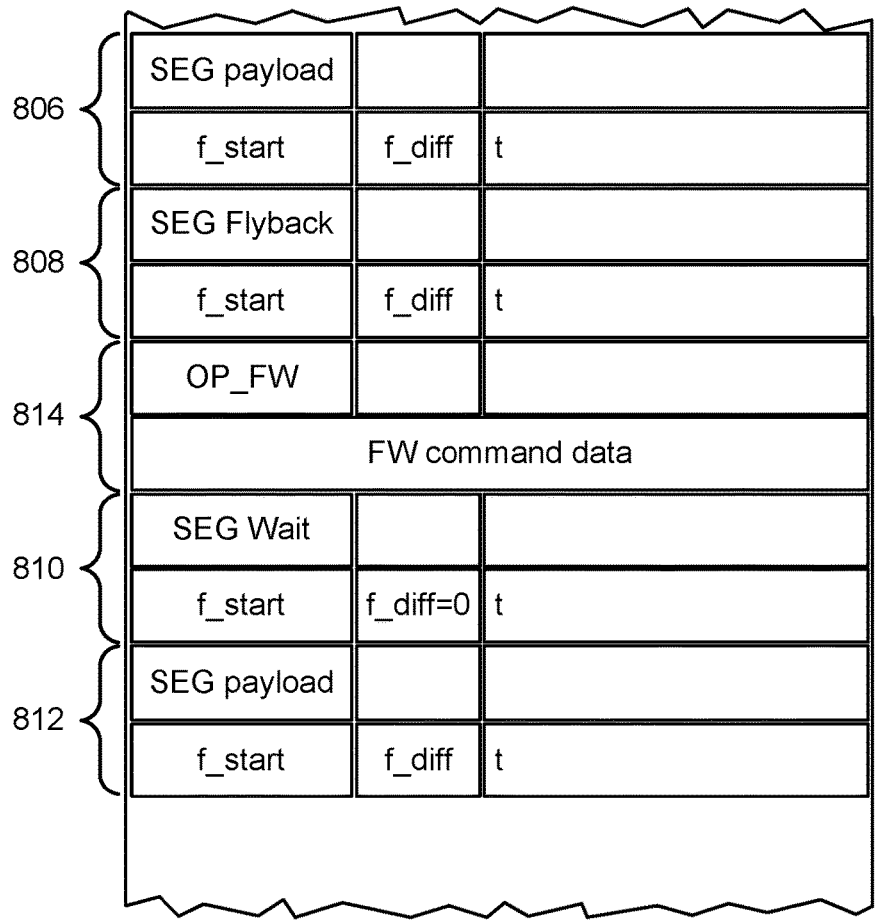

FIG. 8 illustrates a diagram 800 of parallel operations performed by a sequencer and a CPU, respectively, that are performed according to a sequencing program 802. Only a portion of the sequencing program 802 is illustrated. The diagram 800 shows a frequency-modulated ramp signal 804 that includes a plurality of frequency ramps generated by a ramp signal generator (e.g., signal generator 450). The frequency-modulated ramp signal 804 may be generated according to an execution of the sequencing program 802 by the sequencer (e.g., sequencer 430). In addition, the diagram 800 shows states of the CPU (e.g., CPU 702), including idle states and an execution state during which a firmware call is initiated and a firmware program corresponding to the firmware call is executed by the CPU.

Each ramp of the frequency-modulated ramp signal 804 may be generated according to a plurality of ramp parameters. In particular, each ramp may include a payload segment (SEG payload), a flyback segment (SEG flyback), and a wait segment (SEG wait), each of which is controlled by a respective ramp opcode 806, 808, 810, and 812 of the sequencing program 802. Each ramp opcode 806, 808, 810, and 812 may control one or more corresponding ramp parameters. In addition, the sequencing program 802 may include a firmware opcode (OP_FW) 814 configured to trigger a firmware call and provide FW command data to the CPU when fetched by the CPU.

The ramp opcode 806 defines one or more control values for a payload segment (SEG payload) that are extracted by the sequencer and used as control inputs to the signal generator 450 for controlling respective control parameters (i.e., ramp parameters). In this example, the ramp opcode 806 may define a control value for a start frequency f_start of the payload segment, a control value for a frequency difference f_diff of the payload segment, and a time interval/ of the payload segment. The ramp opcode 812 defines one or more control values for another payload segment (SEG payload) that are extracted by the sequencer and used as control inputs to the signal generator 450 for controlling respective control parameters (i.e., ramp parameters). The ramp opcode 812 may be executed after the flyback segment (SEG flyback) and the wait segment (SEG wait) that correspond to the ramp opcode 806 (e.g., after ramp opcodes 808 and 810). As a result, an execution of the ramp opcode 812 may have a predetermined time dependency relative to the execution of ramp opcodes 806, 808, 810, as well as any ramp opcodes that precede the ramp opcode 806 and any ramp opcodes that follow the ramp opcode 812. Thus, each payload segment may have a payload segment defined by these three ramp parameters provided in a corresponding ramp opcode. The sequencer is configured to read the sequencing program from the first memory 708, extract the control values defined in the sequencing program for the frequency ramps, and provide the control values to the signal generator 450 in the manner described herein.

Similarly, the ramp opcode 808 may define control values for the flyback segment (SEG flyback) that are extracted by the sequencer and used as control inputs to the signal generator 450 for controlling respective control parameters (i.e., ramp parameters). In this example, the ramp opcode 808 defines a control value for a start frequency f_start of the flyback segment, a control value for a frequency difference f_diff of the flyback segment, and a time interval t of the flyback segment. Thus, each flyback segment may have a flyback segment defined by these three ramp parameters. The sequencer may be configured to read the sequencing program from the first memory 708, extract the control values defined in the sequencing program for the frequency ramps, and provide the control values to the signal generator 450 in the manner described herein.

The ramp opcode 810 may define control values for the wait segment (SEG wait) that are extracted by the sequencer and used as control inputs to the signal generator 450 for controlling respective control parameters (i.e., ramp parameters). In this example, the ramp opcode 810 defines a control value for the start frequency f_start of the wait segment, a control value (0) for the frequency difference f_diff of the wait segment (i.e., the frequency of the ramp signal remains constant during the wait interval), and time interval/of the wait segment. Thus, each wait segment may have a wait segment defined by these three ramp parameters. In some cases, the ramp opcode 810 may correspond to a short wait ramp segment between two frequency ramps of a same frequency ramp sequence. In some cases, the ramp opcode 810 may correspond to a long wait ramp segment between two frequency ramps of different frequency ramp sequences (e.g., a long wait ramp segment between two frequency ramp sequences). The sequencer may be configured to read the sequencing program from the first memory 708, extract the control values defined in the sequencing program for the frequency ramps, and provide the control values to the signal generator 450 in the manner described herein.

When the sequencer reads the firmware opcode 814 in the sequencing program 802, the sequencer may transmit a start signal to the CPU to start an execution of the firmware call. The start signal may be an interrupt or another type of trigger signal used to initiate the execution of the firmware call. For example, the CPU may poll a sequencer status bit of the sequencer to determine when to start the execution of the firmware call. In response to the start signal, the CPU may fetch information from the firmware opcode 814, such as the FW command data that may include timing information corresponding to a start time of the execution of the firmware program that is associated with the firmware opcode 814.

The CPU may execute the firmware program synchronously with an execution of a ramp segment of the ramp scenario. For example, the ramp segment may be the wait segment, as defined by the ramp opcode 810, which follows the firmware opcode 814 in the sequencing program. The CPU may execute the firmware program synchronously with an execution of the wait segment defined by ramp opcode 810 that immediately follows the firmware opcode 814 in the sequencing program. In some implementations, the ramp segment synchronized with the execution of the firmware program may correspond to a ramp opcode that is further down in the sequencing program 802. In other words, the execution of the firmware program may be synchronized with a ramp opcode that is not adjacent to the firmware opcode 814 in the sequencing program 802. The CPU may be configured to execute the firmware program from the second memory 712 in parallel to the signal generator 450 generating the frequency-modulated ramp signal.

As indicated above, FIG. 8 is provided as an example. Other examples may differ from what is described with regard to FIG. 8.

Figure 9:
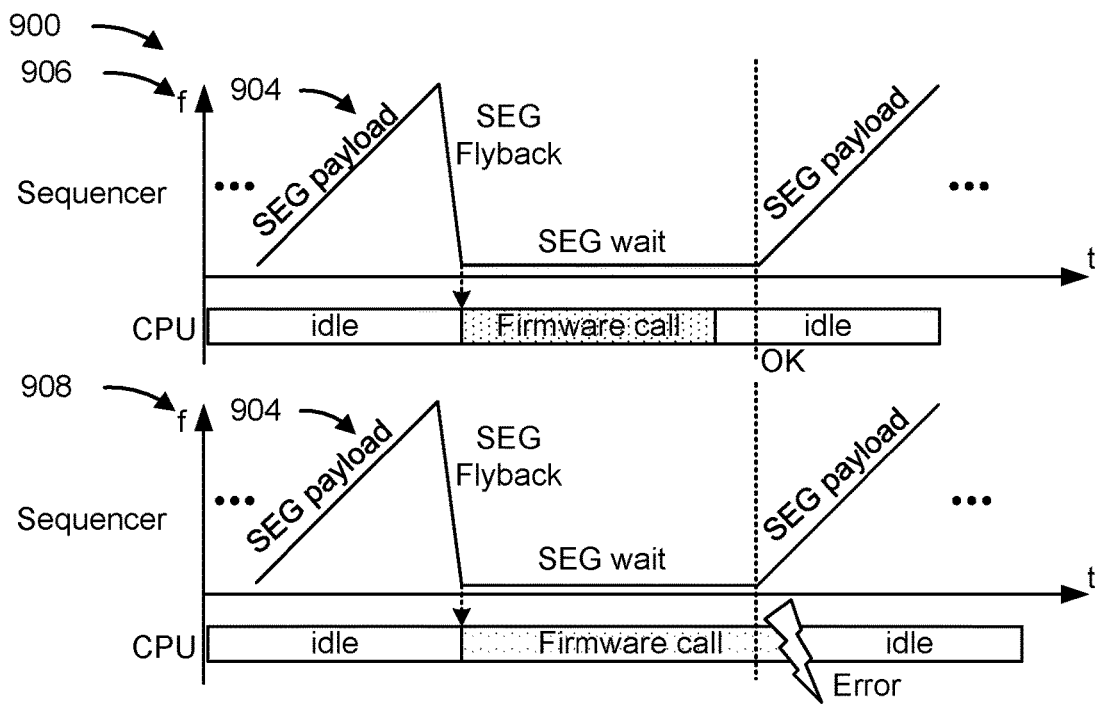
FIG. 9 illustrates a diagram of parallel operations performed by a sequencer and a CPU, respectively, that are performed according to a sequencing program.
Figure 9:
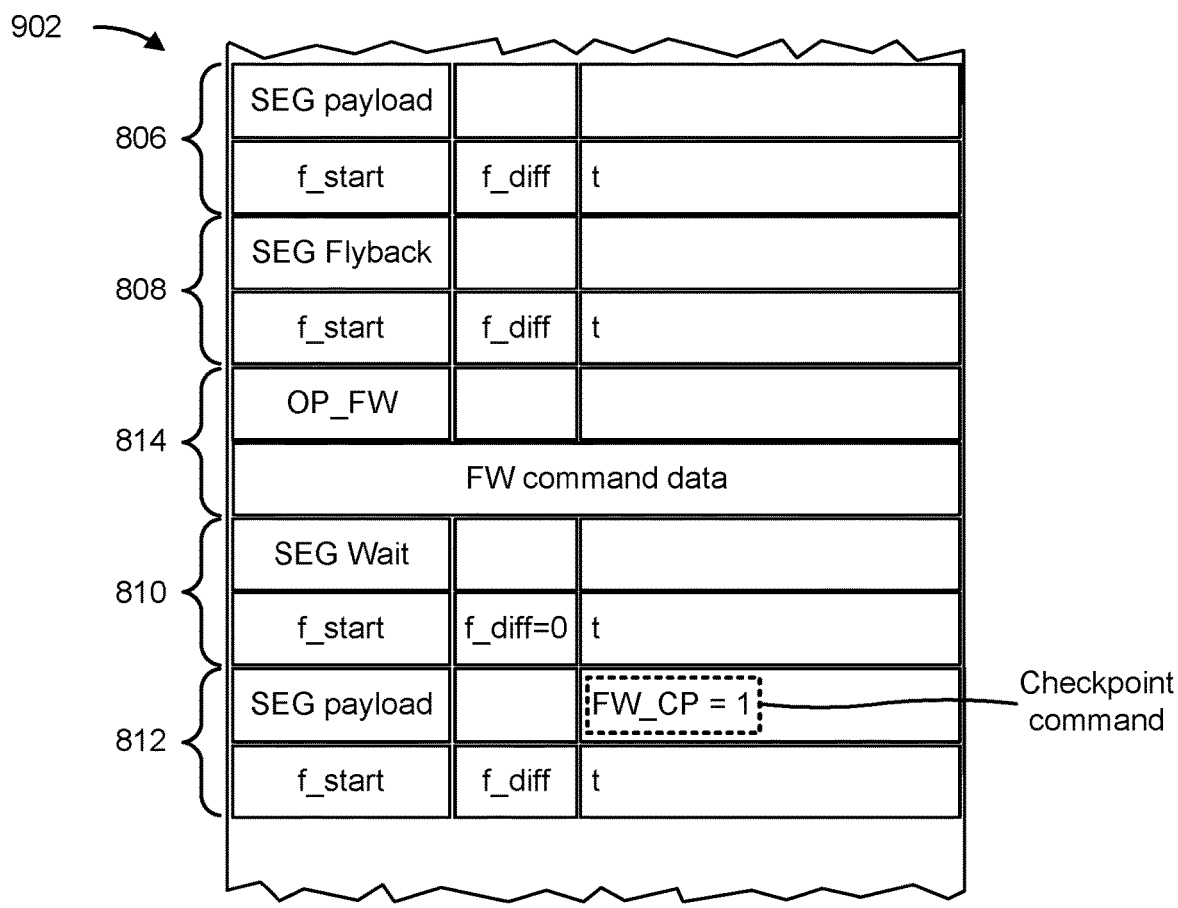

FIG. 9 illustrates a diagram 900 of parallel operations performed by a sequencer and a CPU, respectively, that are performed according to a sequencing program 902. Only a portion of the sequencing program 902 is illustrated. The diagram 900 shows a frequency-modulated ramp signal 904 that includes a plurality of frequency ramps generated by a ramp signal generator (e.g., signal generator 450). The frequency-modulated ramp signal 904 may be generated according to an execution of the portion of the sequencing program 902 by the sequencer (e.g., sequencer 430). In addition, the diagram 900 shows a state of the CPU (e.g., CPU 702), including idle states and an execution state during which a firmware call is initiated and a firmware program corresponding to the firmware call is executed by the CPU.

The diagram 900 shows a first scenario 906 during which an execution of the firmware program by the CPU finishes within a desired time interval (e.g., prior to an execution start time of a second ramp opcode). The diagram 900 shows a second scenario 908 during which the execution of the firmware program by the CPU does not finish within the desired time interval (e.g., prior to the execution start time of a second ramp opcode) and triggers further action by the sequencer. For example, the sequencer may initiate one or more functions if the sequencer determines that the execution of the firmware program by the CPU has not been completed prior to a target time (e.g., prior to the execution start time of the second ramp opcode).

A checkpoint command (e.g., a sequencer status bit) may be provided in one of the ramp opcodes. When the sequencer reads the checkpoint command, the sequencer may check a status of the CPU (e.g., an execution status of the execution of the firmware program by the CPU) and determine whether the execution of the firmware program by the CPU has been completed. If the sequencer determines that the execution of the firmware program by the CPU has not been completed at the time of this check, the sequencer may determine that the execution of the firmware program by the CPU has not been completed prior to the target time.

For example, the ramp opcode 812 may include the checkpoint command. Thus, the sequencer may check on the execution status of the execution of the firmware program at a start of the payload segment (SEG payload) that corresponds to the ramp opcode 812.

As indicated above, FIG. 9 is provided as an example. Other examples may differ from what is described with regard to FIG. 9.

The following provides an overview of some Aspects of the present disclosure:

Aspect 1: A radar semiconductor chip, comprising: a ramp signal generator configured to generate a frequency-modulated ramp signal comprising a plurality of frequency ramps of a ramp scenario, wherein the ramp signal generator is configured to generate the plurality of frequency ramps according to a plurality of ramp parameters, and wherein the ramp signal generator is configured to generate each frequency ramp with a predetermined time dependency relative to each other frequency ramp of the plurality of frequency ramps; a first memory configured to store a sequencing program associated with generating the frequency-modulated ramp signal, wherein the sequencing program includes a plurality of ramp opcodes that defines the plurality of frequency ramps and a firmware opcode configured to trigger a firmware call, and wherein each ramp opcode of the plurality of ramp opcodes defines a respective timing for a respective frequency ramp such that the predetermined time dependency for each frequency ramp relative to the other frequency ramps of the plurality of frequency ramps is maintained; a second memory configured to store a firmware program corresponding to the firmware opcode of the sequencing program; a sequencer configured to read the sequencing program from the first memory, derive control values for the plurality of ramp parameters based on the plurality of ramp opcodes, provide the control values to the ramp signal generator, and provide a start signal to start an execution of the firmware call in response to reading the firmware opcode in the sequencing program; and a central processing unit (CPU) configured to receive the start signal from the sequencer and, in response to the start signal to start the execution of the firmware call, execute the firmware program from the second memory in parallel to the ramp signal generator generating the frequency-modulated ramp signal, wherein the ramp signal generator is configured to receive the control values and generate the plurality of frequency ramps based on the control values.

Aspect 2: The radar semiconductor chip of Aspect 1, wherein, in response to the start signal, the CPU is configured to: fetch information from the firmware opcode from the sequencing program; and execute the firmware program from the second memory based on the information fetched from the firmware opcode.

Aspect 3: The radar semiconductor chip of any of Aspects 1-2, wherein the CPU is configured to execute the firmware program synchronously with an execution of a ramp segment of the frequency-modulated ramp signal, wherein the ramp segment is defined by a ramp opcode of the plurality of ramp opcodes that immediately follows the firmware opcode in the sequencing program.

Aspect 4: The radar semiconductor chip of any of Aspects 1-3, wherein the frequency-modulated ramp signal corresponding to the ramp scenario comprises a plurality of ramp segments, wherein each ramp opcode of the plurality of ramp opcodes defines a corresponding ramp segment of the plurality of ramp segments, wherein the CPU is configured to execute the firmware program synchronously with an execution of a ramp segment of the ramp scenario, and wherein the ramp segment is defined by a ramp opcode of the plurality of ramp opcodes that follows the firmware opcode in the sequencing program.

Aspect 5: The radar semiconductor chip of Aspect 4, wherein a start time for executing the ramp segment by the sequencer is synchronous with a start time for executing the firmware program by the CPU.

Aspect 6: The radar semiconductor chip of any of Aspects 1-5, wherein the sequencer is configured to generate the start signal synchronously with executing a ramp opcode of the plurality of ramp opcodes that immediately follows the firmware opcode in the sequencing program.

Aspect 7: The radar semiconductor chip of any of Aspects 1-6, wherein the ramp scenario comprises a plurality of ramp sequences that provide the plurality of frequency ramps, wherein each ramp sequence comprises a sequence of frequency ramps, wherein consecutive ramp sequences are separated by a wait segment, and wherein the CPU is configured to execute the firmware program synchronously with the wait segment.

Aspect 8: The radar semiconductor chip of Aspect 7, wherein the wait segment is defined by a first ramp opcode of the plurality of ramp opcodes that follows the firmware opcode in the sequencing program, and wherein the sequencer is configured to determine whether an execution of the firmware program has been completed prior to an execution start time of a second ramp opcode that follows the first ramp opcode in the sequencing program.

Aspect 9: The radar semiconductor chip of any of Aspects 1-8, wherein the sequencer is configured to determine whether an execution of the firmware program has been completed prior to an execution start time of a second ramp opcode that follows a first ramp opcode in the sequencing program, and wherein the firmware program is executed synchronously with an execution of the first ramp opcode.

Aspect 10: The radar semiconductor chip of Aspect 9, wherein the sequencer is configured to generate an error signal in response to determining that the execution of the firmware program has not been completed prior to the execution start time of the second ramp opcode.

Aspect 11: The radar semiconductor chip of Aspect 9, wherein the sequencer is configured to maintain the timing for each frequency ramp such that the predetermined time dependency for each frequency ramp relative to the other frequency ramps of the plurality of frequency ramps is preserved.

Aspect 12: The radar semiconductor chip of Aspect 9, wherein the sequencer is configured to monitor an execution progress of the firmware program by the CPU and disregard an execution of the firmware program if the firmware program has not been completed prior to an end of the execution of the first ramp opcode or if the firmware program has not been completed prior to the execution start time of the second ramp opcode.

Aspect 13: The radar semiconductor chip of Aspect 9, wherein the sequencer is configured to terminate an execution of the firmware program in response to determining that the execution of the firmware program has not been completed prior to the execution start time of the second ramp opcode.

Aspect 14: The radar semiconductor chip of any of Aspects 1-13, wherein the plurality of ramp parameters include at least one of a ramp start frequency of the frequency-modulated ramp signal, a ramp stop frequency of the frequency-modulated ramp signal, a ramp frequency difference of the frequency-modulated ramp signal, a ramp time interval of the frequency-modulated ramp signal, a ramp wait time interval of the frequency-modulated ramp signal, a phase of the frequency-modulated ramp signal, a phase offset of the frequency-modulated ramp signal, a signal output power of the frequency-modulated ramp signal, a filter configuration of a radar circuit component of the radar semiconductor chip, a gain configuration of a radar circuit component of the radar semiconductor chip, a power amplifier configuration of a radar circuit component of the radar semiconductor chip, a sampling start time of a radar circuit component of the radar semiconductor chip, a monitoring configuration of a radar circuit component of the radar semiconductor chip, a chip pin output configuration of the radar semiconductor chip, or data acquisition information of a radar circuit component of the radar semiconductor chip.

Aspect 15: The radar semiconductor chip of any of Aspects 1-14, wherein the firmware opcode is a first firmware opcode, and wherein the sequencing program includes a second firmware opcode configured to trigger a second firmware call, wherein the second firmware opcode is adjacent to the first firmware opcode in the sequencing program.

Aspect 16: The radar semiconductor chip of Aspect 15, wherein the firmware program is a first firmware program, wherein the second memory is configured to store a second firmware program corresponding to the second firmware opcode of the sequencing program, wherein the sequencer is configured to provide an additional start signal to start an execution of the second firmware call in response to reading the second firmware opcode in the sequencing program, and wherein the CPU is configured to receive the additional start signal from the sequencer and, in response to the additional start signal, execute the second firmware program from the second memory in parallel to the ramp signal generator generating the frequency-modulated ramp signal.

Aspect 17: A radar semiconductor chip, comprising: a ramp signal generator configured to generate a frequency-modulated ramp signal comprising a plurality of frequency ramps of a ramp scenario, wherein the ramp signal generator is configured to generate the plurality of frequency ramps according to a plurality of ramp parameters; a first memory configured to store a sequencing program associated with generating the frequency-modulated ramp signal, wherein the sequencing program includes a plurality of ramp opcodes configured to define the plurality of frequency ramps and a firmware opcode configured to trigger a firmware call; a second memory configured to store a firmware program corresponding to the firmware opcode of the sequencing program; a sequencer configured to read the sequencing program from the first memory, derive control values for the plurality of ramp parameters based on the plurality of ramp opcodes, provide the control values to the ramp signal generator, and provide a start signal to start an execution of the firmware call in response to reading the firmware opcode in the sequencing program; and a central processing unit (CPU) configured to receive the start signal from the sequencer and, in response to the start signal, execute the firmware program from the second memory in parallel to the ramp scenario, wherein the ramp signal generator is configured to receive the control values and generate the plurality of frequency ramps based on the control values.

Aspect 18: The radar semiconductor chip of Aspect 17, wherein, in response to the start signal, the CPU is configured to: fetch information from the firmware opcode from the sequencing program; and execute the firmware program from the second memory based on the information fetched from the firmware opcode.

Aspect 19: The radar semiconductor chip of any of Aspects 17-18, wherein the CPU is configured to execute the firmware program synchronously with an execution of a ramp segment of the frequency-modulated ramp signal, wherein the ramp segment is defined by a ramp opcode of the plurality of ramp opcodes that follows the firmware opcode in the sequencing program.

Aspect 20: A method for controlling a radar circuit of a radar semiconductor chip, the method comprising: storing, in a first memory, a sequencing program associated with generating a frequency-modulated ramp signal, wherein the sequencing program includes a plurality of ramp opcodes configured to define a plurality of frequency ramps of the frequency-modulated ramp signal, and a firmware opcode configured to trigger a firmware call, and wherein the plurality of ramp opcodes defines a timing for each frequency ramp such that a predetermined time dependency for each frequency ramp relative to other frequency ramps of the plurality of frequency ramps is maintained; storing, in a second memory, a firmware program corresponding to the firmware opcode of the sequencing program; reading, by a sequencer, the sequencing program from the first memory; deriving, by the sequencer, control values for a plurality of ramp parameters based on the plurality of ramp opcodes; providing, by the sequencer, the control values to a ramp signal generator configured to generate the frequency-modulated ramp signal; triggering, by the sequencer, the firmware call in response to reading the firmware opcode in the sequencing program; in response to the firmware call, executing, by a central processing unit (CPU), the firmware program from the second memory in parallel with a generation of the frequency-modulated ramp signal by the ramp signal generator; and generating, by a ramp generator, the frequency-modulated ramp signal based on the control values, wherein the frequency-modulated ramp signal is generated in parallel with an execution of the firmware program by the CPU, and wherein each frequency ramp is generated with the predetermined time dependency relative to each other frequency ramp of the plurality of frequency ramps in accordance with the plurality of ramp opcodes.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable gate arrays (FPGAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A radar semiconductor chip, comprising:
   a ramp signal generator configured to generate a frequency-modulated ramp signal comprising a plurality of frequency ramps of a ramp scenario, wherein the ramp signal generator is configured to generate the plurality of frequency ramps according to a plurality of ramp parameters, and wherein the ramp signal generator is configured to generate each frequency ramp with a predetermined time dependency relative to each other frequency ramp of the plurality of frequency ramps;
   a first memory configured to store a sequencing program associated with generating the frequency-modulated ramp signal, wherein the sequencing program includes a plurality of ramp opcodes that defines the plurality of frequency ramps and a firmware opcode configured to trigger a firmware call, and wherein each ramp opcode of the plurality of ramp opcodes defines a respective timing for a respective frequency ramp such that the predetermined time dependency for each frequency ramp relative to the other frequency ramps of the plurality of frequency ramps is maintained;
   a second memory configured to store a firmware program corresponding to the firmware opcode of the sequencing program;
   a sequencer configured to read the sequencing program from the first memory, derive control values for the plurality of ramp parameters based on the plurality of ramp opcodes, provide the control values to the ramp signal generator, and provide a start signal to start an execution of the firmware call in response to reading the firmware opcode in the sequencing program; and
   a central processing unit (CPU) configured to receive the start signal from the sequencer and, in response to the start signal to start the execution of the firmware call, execute the firmware program from the second memory in parallel to the ramp signal generator generating the frequency-modulated ramp signal,
   wherein the ramp signal generator is configured to receive the control values and generate the plurality of frequency ramps based on the control values.

2. The radar semiconductor chip of claim 1, wherein, in response to the start signal, the CPU is configured to:
   fetch information from the firmware opcode from the sequencing program; and
   execute the firmware program from the second memory based on the information fetched from the firmware opcode.

3. The radar semiconductor chip of claim 1, wherein the CPU is configured to execute the firmware program synchronously with an execution of a ramp segment of the frequency-modulated ramp signal, wherein the ramp segment is defined by a ramp opcode of the plurality of ramp opcodes that immediately follows the firmware opcode in the sequencing program.

4. The radar semiconductor chip of claim 1, wherein the frequency-modulated ramp signal corresponding to the ramp scenario comprises a plurality of ramp segments,
   wherein each ramp opcode of the plurality of ramp opcodes defines a corresponding ramp segment of the plurality of ramp segments,
   wherein the CPU is configured to execute the firmware program synchronously with an execution of a ramp segment of the ramp scenario, and
   wherein the ramp segment is defined by a ramp opcode of the plurality of ramp opcodes that follows the firmware opcode in the sequencing program.

5. The radar semiconductor chip of claim 4, wherein a start time for executing the ramp segment by the sequencer is synchronous with a start time for executing the firmware program by the CPU.

6. The radar semiconductor chip of claim 1, wherein the sequencer is configured to generate the start signal synchronously with executing a ramp opcode of the plurality of ramp opcodes that immediately follows the firmware opcode in the sequencing program.

7. The radar semiconductor chip of claim 1, wherein the ramp scenario comprises a plurality of ramp sequences that provide the plurality of frequency ramps,
   wherein each ramp sequence comprises a sequence of frequency ramps,
   wherein consecutive ramp sequences are separated by a wait segment, and
   wherein the CPU is configured to execute the firmware program synchronously with the wait segment.

8. The radar semiconductor chip of claim 7, wherein the wait segment is defined by a first ramp opcode of the plurality of ramp opcodes that follows the firmware opcode in the sequencing program, and wherein the sequencer is configured to determine whether an execution of the firmware program has been completed prior to an execution start time of a second ramp opcode that follows the first ramp opcode in the sequencing program.

9. The radar semiconductor chip of claim 1, wherein the sequencer is configured to determine whether an execution of the firmware program has been completed prior to an execution start time of a second ramp opcode that follows a first ramp opcode in the sequencing program, and wherein the firmware program is executed synchronously with an execution of the first ramp opcode.

10. The radar semiconductor chip of claim 9, wherein the sequencer is configured to generate an error signal in response to determining that the execution of the firmware program has not been completed prior to the execution start time of the second ramp opcode.

11. The radar semiconductor chip of claim 9, wherein the sequencer is configured to maintain a timing for each frequency ramp such that the predetermined time dependency for each frequency ramp relative to the other frequency ramps of the plurality of frequency ramps is preserved.

12. The radar semiconductor chip of claim 9, wherein the sequencer is configured to monitor an execution progress of the firmware program by the CPU and disregard an execution of the firmware program if the firmware program has not been completed prior to an end of the execution of the first ramp opcode or if the firmware program has not been completed prior to the execution start time of the second ramp opcode.

13. The radar semiconductor chip of claim 9, wherein the sequencer is configured to terminate an execution of the firmware program in response to determining that the execution of the firmware program has not been completed prior to the execution start time of the second ramp opcode.

14. The radar semiconductor chip of claim 1, wherein the plurality of ramp parameters include at least one of a ramp start frequency of the frequency-modulated ramp signal, a ramp stop frequency of the frequency-modulated ramp signal, a ramp frequency difference of the frequency-modulated ramp signal, a ramp time interval of the frequency-modulated ramp signal, a ramp wait time interval of the frequency-modulated ramp signal, a phase of the frequency-modulated ramp signal, a phase offset of the frequency-modulated ramp signal, a signal output power of the frequency-modulated ramp signal, a filter configuration of a radar circuit component of the radar semiconductor chip, a gain configuration of a radar circuit component of the radar semiconductor chip, a power amplifier configuration of a radar circuit component of the radar semiconductor chip, a sampling start time of a radar circuit component of the radar semiconductor chip, a monitoring configuration of a radar circuit component of the radar semiconductor chip, a chip pin output configuration of the radar semiconductor chip, or data acquisition information of a radar circuit component of the radar semiconductor chip.

15. The radar semiconductor chip of claim 1, wherein the firmware opcode is a first firmware opcode, and wherein the sequencing program includes a second firmware opcode configured to trigger a second firmware call, wherein the second firmware opcode is adjacent to the first firmware opcode in the sequencing program.

16. The radar semiconductor chip of claim 15, wherein the firmware program is a first firmware program, wherein the second memory is configured to store a second firmware program corresponding to the second firmware opcode of the sequencing program, wherein the sequencer is configured to provide an additional start signal to start an execution of the second firmware call in response to reading the second firmware opcode in the sequencing program, and wherein the CPU is configured to receive the additional start signal from the sequencer and, in response to the additional start signal, execute the second firmware program from the second memory in parallel to the ramp signal generator generating the frequency-modulated ramp signal.

17. A radar semiconductor chip, comprising:
a ramp signal generator configured to generate a frequency-modulated ramp signal comprising a plurality of frequency ramps of a ramp scenario, wherein the ramp signal generator is configured to generate the plurality of frequency ramps according to a plurality of ramp parameters;
a first memory configured to store a sequencing program associated with generating the frequency-modulated ramp signal, wherein the sequencing program includes a plurality of ramp opcodes configured to define the plurality of frequency ramps and a firmware opcode configured to trigger a firmware call;
a second memory configured to store a firmware program corresponding to the firmware opcode of the sequencing program;
a sequencer configured to read the sequencing program from the first memory, derive control values for the plurality of ramp parameters based on the plurality of ramp opcodes, provide the control values to the ramp signal generator, and provide a start signal to start an execution of the firmware call in response to reading the firmware opcode in the sequencing program; and
a central processing unit (CPU) configured to receive the start signal from the sequencer and, in response to the start signal, execute the firmware program from the second memory in parallel to the ramp scenario,
wherein the ramp signal generator is configured to receive the control values and generate the plurality of frequency ramps based on the control values.

18. The radar semiconductor chip of claim 17, wherein, in response to the start signal, the CPU is configured to:
fetch information from the firmware opcode from the sequencing program; and
execute the firmware program from the second memory based on the information fetched from the firmware opcode.

19. The radar semiconductor chip of claim 17, wherein the CPU is configured to execute the firmware program synchronously with an execution of a ramp segment of the frequency-modulated ramp signal, wherein the ramp segment is defined by a ramp opcode of the plurality of ramp opcodes that follows the firmware opcode in the sequencing program.

20. A method for controlling a radar circuit of a radar semiconductor chip, the method comprising:
storing, in a first memory, a sequencing program associated with generating a frequency-modulated ramp signal,
wherein the sequencing program includes a plurality of ramp opcodes configured to define a plurality of frequency ramps of the frequency-modulated ramp signal, and a firmware opcode configured to trigger a firmware call, and
  wherein the plurality of ramp opcodes defines a timing for each frequency ramp such that a predetermined time dependency for each frequency ramp relative to other frequency ramps of the plurality of frequency ramps is maintained;
storing, in a second memory, a firmware program corresponding to the firmware opcode of the sequencing program;
reading, by a sequencer, the sequencing program from the first memory;
deriving, by the sequencer, control values for a plurality of ramp parameters based on the plurality of ramp opcodes,
providing, by the sequencer, the control values to a ramp signal generator configured to generate the frequency-modulated ramp signal;
triggering, by the sequencer, the firmware call in response to reading the firmware opcode in the sequencing program;
in response to the firmware call, executing, by a central processing unit (CPU), the firmware program from the second memory in parallel with a generation of the frequency-modulated ramp signal by the ramp signal generator; and
generating, by a ramp generator, the frequency-modulated ramp signal based on the control values,
  wherein the frequency-modulated ramp signal is generated in parallel with an execution of the firmware program by the CPU, and
  wherein each frequency ramp is generated with the predetermined time dependency relative to each other frequency ramp of the plurality of frequency ramps in accordance with the plurality of ramp opcodes.

* * * * *